US010391894B2

(12) United States Patent
Nagura et al.

(10) Patent No.: US 10,391,894 B2
(45) Date of Patent: Aug. 27, 2019

(54) VEHICLE SEAT RECLINING DEVICE

(71) Applicant: AISIN SEIKI KABUSHIKI KAISHA, Kariya-shi (JP)

(72) Inventors: Mikihito Nagura, Paris (FR); Naoaki Hoshihara, Obu (JP); Shinya Isobe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 87 days.

(21) Appl. No.: 15/541,864

(22) PCT Filed: Jan. 29, 2016

(86) PCT No.: PCT/JP2016/052797

§ 371 (c)(1),
(2) Date: Jul. 6, 2017

(87) PCT Pub. No.: WO2016/129423

PCT Pub. Date: Aug. 18, 2016

(65) Prior Publication Data

US 2018/0009340 A1 Jan. 11, 2018

(30) Foreign Application Priority Data

Feb. 10, 2015 (JP) ................................ 2015-024223

(51) Int. Cl.
*B60N 2/20* (2006.01)
*B60N 2/235* (2006.01)
*B60N 2/22* (2006.01)

(52) U.S. Cl.
CPC ............... *B60N 2/236* (2015.04); *B60N 2/20* (2013.01); *B60N 2/2227* (2013.01)

(58) Field of Classification Search
CPC ......... B60N 2/236; B60N 2/20; B60N 2/2227
(Continued)

(56) References Cited

U.S. PATENT DOCUMENTS 4,143,905 A * 3/1979 Hensel .................. B60N 2/433 280/650
5,779,313 A * 7/1998 Rohee ................. B60N 2/2358 297/366

(Continued)

FOREIGN PATENT DOCUMENTS

JP 2010-042239 A 2/2010
WO WO 2014/050076 A1 4/2014

OTHER PUBLICATIONS

U.S. Appl. No. 15/120,353, filed Aug. 19, 2016, US 2017/0066348 A1, Mikihito Nagura, et al.

(Continued)

*Primary Examiner* — Mark R Wendell
(74) *Attorney, Agent, or Firm* — Oblon, McClelland, Maier & Neustadt, L.L.P.

(57) ABSTRACT

A second bracket of a vehicle seat reclining device includes a first pawl restriction portion and a second pawl restriction portion arranged respectively in correspondence with a first pawl and a second pawl to restrict movement of the first pawl and the second pawl in the radial direction. The second pawl restriction portion is located toward the positive direction and a radially inner side from the first pawl restriction portion. Negative direction ends of the first pawl restriction portion and the second pawl restriction portion are arranged to contact positive direction corners of the limitation portions of the first pawl and the second pawl when a rotation angle of the second bracket relative to the first bracket is a specified angle. The first pawl restriction portion allows movement of the second pawl toward the radially outer side.

5 Claims, 11 Drawing Sheets

(58) Field of Classification Search
USPC .......................................................... 297/373
See application file for complete search history.

(56) References Cited

U.S. PATENT DOCUMENTS

| | | | | | |
|---|---|---|---|---|---|
| 6,102,480 | A * | 8/2000 | Asano | B60N 2/236 | 297/366 |
| 6,312,053 | B1 * | 11/2001 | Magyar | B60N 2/20 | 297/367 R |
| 6,390,557 | B1 * | 5/2002 | Asano | B60N 2/236 | 297/367 R |
| 6,715,835 | B2 | 4/2004 | Hoshihara et al. | | |
| 7,552,971 | B1 * | 6/2009 | Tarusawa | B60N 2/236 | 297/367 P |
| 7,828,386 | B2 * | 11/2010 | Reubeuze | B60N 2/2358 | 297/367 P |
| 7,963,607 | B2 * | 6/2011 | Heo | B60N 2/2362 | 297/367 P |
| 8,882,199 | B2 * | 11/2014 | Yamada | 297/367 P | |
| 8,926,018 | B2 * | 1/2015 | Ito | A47C 1/025 | 297/366 |
| 8,955,910 | B2 * | 2/2015 | Line | B60N 2/2245 | 297/367 L |
| 8,985,690 | B2 * | 3/2015 | Yamada | B60N 2/2358 | 297/341 |
| 9,302,599 | B2 * | 4/2016 | Mase | B60N 2/2356 | |
| 2002/0043852 | A1 * | 4/2002 | Uramichi | B60N 2/236 | 297/366 |
| 2003/0230923 | A1 * | 12/2003 | Uramichi | B60N 2/236 | 297/367 R |
| 2007/0132294 | A1 * | 6/2007 | Yamada | B60N 2/236 | 297/367 R |
| 2009/0230746 | A1 * | 9/2009 | Ng | B60N 2/20 | 297/365 |
| 2009/0243360 | A1 * | 10/2009 | Tarusawa | B60N 2/236 | 297/362 |
| 2009/0243361 | A1 * | 10/2009 | Tarusawa | B60N 2/236 | 297/362 |
| 2009/0243363 | A1 * | 10/2009 | Tarusawa | B60N 2/236 | 297/367 P |
| 2010/0033004 | A1 * | 2/2010 | Reubeuze | B60N 2/2362 | 297/367 P |
| 2010/0109408 | A1 * | 5/2010 | Ohba | B60N 2/2362 | 297/367 P |
| 2010/0194164 | A1 * | 8/2010 | Cha | B60N 2/2362 | 297/362 |
| 2010/0194165 | A1 * | 8/2010 | Iguchi | B60N 2/2362 | 297/367 P |
| 2011/0018325 | A1 | 1/2011 | Yamada et al. | | |
| 2011/0025114 | A1 * | 2/2011 | Berndtson | B60N 2/236 | 297/367 P |
| 2011/0057494 | A1 * | 3/2011 | Reubeuze | B60N 2/2362 | 297/367 P |
| 2011/0101754 | A1 * | 5/2011 | Suzuki | B60N 2/2362 | 297/354.12 |
| 2011/0115271 | A1 * | 5/2011 | Yamada | B60N 2/236 | 297/367 P |
| 2011/0181088 | A1 * | 7/2011 | Zhang | B60N 2/2362 | 297/367 P |
| 2012/0098314 | A1 * | 4/2012 | Kuno | B60N 2/2362 | 297/366 |
| 2012/0139319 | A1 * | 6/2012 | Fujishiro | B60N 2/236 | 297/366 |
| 2012/0217782 | A1 * | 8/2012 | Yamada | B60N 2/2356 | 297/367 R |
| 2013/0161995 | A1 * | 6/2013 | Yamada | B60N 2/12 | 297/367 P |
| 2014/0103693 | A1 * | 4/2014 | Yamada | B60N 2/2356 | 297/354.12 |
| 2014/0125105 | A1 * | 5/2014 | Yamada | B60N 2/2356 | 297/354.12 |

OTHER PUBLICATIONS

International Preliminary Report on Patentability and Written Opinion dated Aug. 15, 2017 in PCT/JP2016/052797.
Combined Office Action and Search Report dated Sep. 5, 2018 in Chinese Patent Application No. 201680009085.7, 14 pages (with English translation).
International Search Report dated May 10, 2016 in PCT/JP2016/052797 filed Jan. 29, 2016.

* cited by examiner

Fig.13A
Fig.13B
Fig.13C
Fig.13D
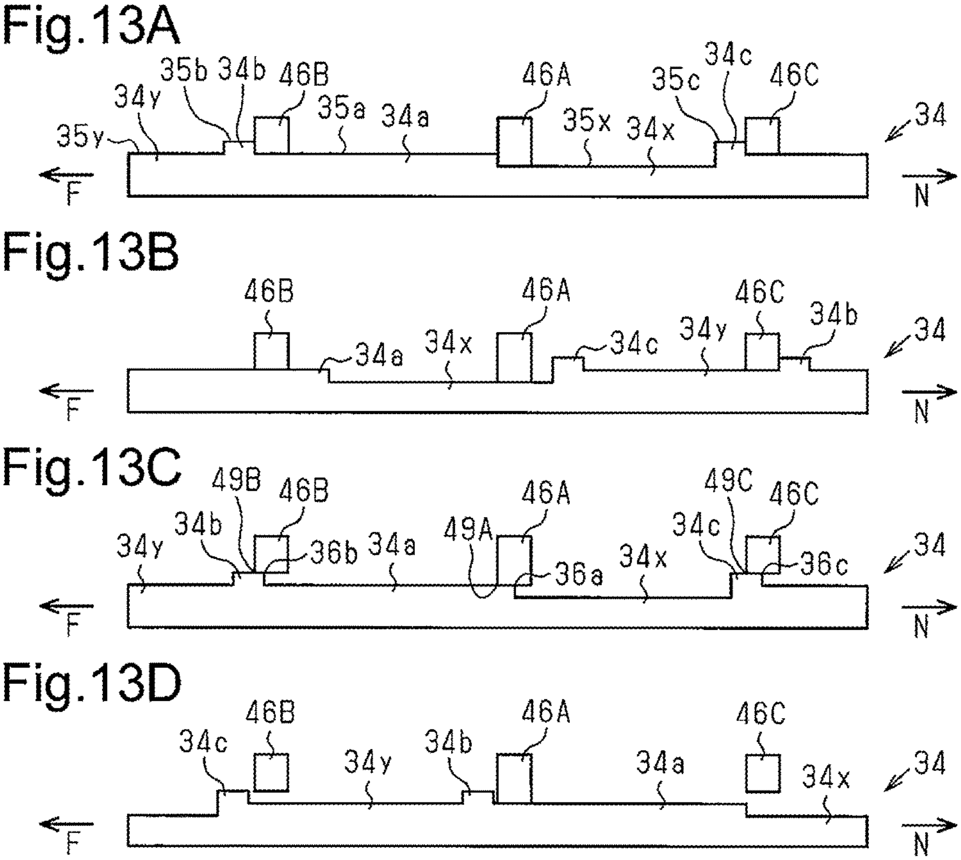
Fig.14(Prior Art)
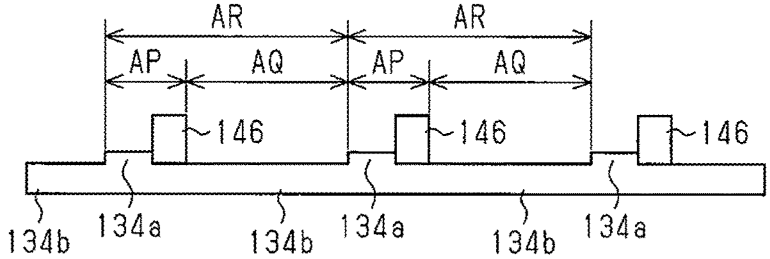

VEHICLE SEAT RECLINING DEVICE

TECHNICAL FIELD

The present invention relates to a vehicle seat reclining device that adjusts the angle of a seat back.

BACKGROUND ART

Patent document 1 describes an example of a vehicle seat reclining device known in the art used for a vehicle seat.

The vehicle seat reclining device of patent document 1 includes two brackets that rotate relative to each other, pawls arranged on a first bracket, and a cam that moves the pawls in a radial direction. Each pawl is biased by the cam to move toward the radially outer side and moves in the radial direction in cooperation with the rotation of the cam. The rotation of the cam moves the pawls toward the radially outer side so that outer teeth of the pawls mesh with inner teeth of a second bracket. This fixes the first bracket to the second bracket. The second bracket includes a pawl restriction portion corresponding to a single predetermined pawl to restrict movement of the predetermined pawl toward the radially outer side. When the rotation angle of the second bracket relative to the first bracket is in a predetermined angle range, the pawl restriction portion engages a limitation portion of the predetermined pawl. This limits movement of each pawl toward the radially outer side and thus allows rotation of the second bracket relative to the first bracket.

However, the technique of patent document 1 has the following problem. Rotation of the second bracket beyond the predetermined angle range biases and pushes the predetermined pawl toward the radially outer side when the limitation portion of the predetermined pawl slides on the pawl restriction portion and reaches an end of the pawl restriction portion. The contact area between the limitation portion of the predetermined pawl and the pawl restriction portion is small at an angle slightly before the predetermined pawl is pushed toward the radially outer side. Thus, when the second bracket rotates to where the predetermined pawl is arranged slightly before the predetermined pawl is pushed toward the radially outer side, an external factor may rotate the cam or a spring may bias and rotate the cam. This will push the predetermined pawl toward the radially outer side, and the pushing force will concentrate at the limitation portion of the predetermined pawl. Thus, the limitation portion of the predetermined pawl or the predetermined pawl may be deformed.

There is also a vehicle seat reclining device in which pawls each include a limitation portion and pawl restriction portions are arranged in correspondence with the limitation portions of the pawls. In this case, when the second bracket rotates beyond the predetermined angle range and the pawls reach an angle where the pawls are pushed toward the radially outer side, the pushing force of the cam produced when an external factor rotates the cam will be dispersed to the pawls. This limits deformation of the pawls. However, in this case, the pawl restriction portions are arranged in correspondence with the pawls. This limits a control angle range of the second bracket to a narrow range in accordance with the number of pawls. The control angle range is an angle range that is the sum of an angle range that restricts movement of the pawls toward the radially outer side and an angle range that allows movement of the pawls toward the radially outer side. Accordingly, in the prior art, it is difficult to limit deformation of the pawls and expand the control angle range.

PRIOR ART DOCUMENT

Patent Document

Patent Document 1: Japanese Laid-Open Patent Publication No. 2010-42239

SUMMARY OF THE INVENTION

Problems that are to be Solved by the Invention

It is an object of the present invention to provide a vehicle seat reclining device that expands the control angle range and limits deformation of pawls.

Means for Solving the Problem

To solve the above problem a vehicle seat reclining device according to a first aspect of the present invention includes a first bracket, a second bracket that rotates relative to the first bracket in positive and negative directions, a cam that rotates or moves relative to the first bracket, and a plurality of pawls moved in a radial direction of the first bracket and engaged with the second bracket by rotation or movement of the cam. Each of the pawls is biased toward a radially outer side and moved in the radial direction in cooperation with the rotation or the movement of the cam. A first pawl and a second pawl of the pawls each include a limitation portion that limits movement in the radial direction. The second bracket includes an outer circumferential wall including inner teeth that mesh with outer teeth of the pawls and a first pawl restriction portion and a second pawl restriction portion arranged respectively in correspondence with the first pawl and the second pawl to engage the corresponding limitation portions and restrict movement of the first pawl and the second pawl in the radial direction. The second pawl restriction portion is located toward the positive direction and a radially inner side from the first pawl restriction portion. Negative direction ends of the first pawl restriction portion and the second pawl restriction portion are arranged to contact positive direction corners of the limitation portions of the first pawl and the second pawl when a rotation angle of the second bracket relative to the first bracket is a specified angle. The first pawl restriction portion allows movement of the second pawl toward the radially outer side.

BRIEF DESCRIPTION OF THE DRAWINGS

FIGS. 13A to 13D are net diagrams showing changes in the positional relationship of the limitation portions of the pawls and pawl restriction portions relative to rotation of the second bracket in a first embodiment of a vehicle seat reclining device.

FIG. 14 is a net diagram showing the positional relationship of pawl restriction portions and limitation portions of pawls in a second bracket of a vehicle seat reclining device in the prior art.

EMBODIMENTS OF THE INVENTION

First Embodiment

A first embodiment of a vehicle seat reclining device will now be described with reference to FIGS. 1 to 15.

Figure 1:
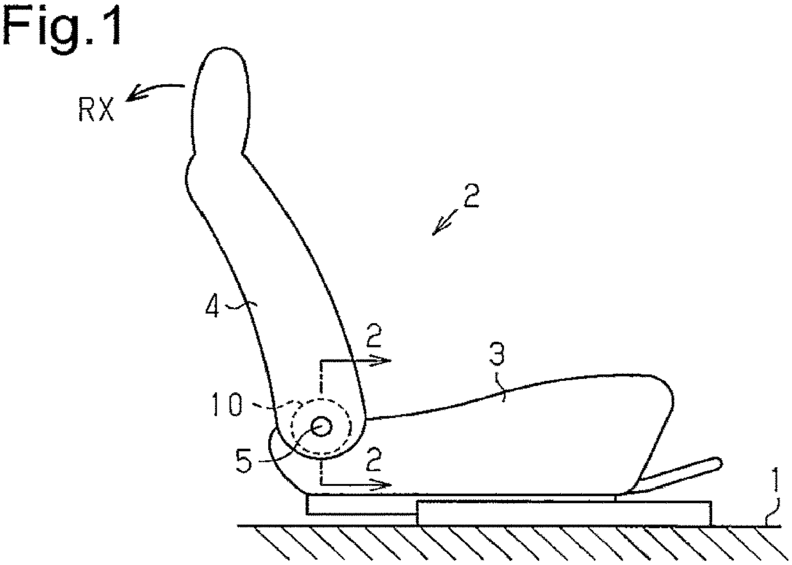
FIG. 1 is a side view showing a seat that includes a vehicle seat reclining device.

As shown in FIG. 1, a vehicle seat reclining device 10 is applied to, for example, a seat 2 arranged on a vehicle floor 1 or the like. The seat 2 includes a seat cushion 3 that forms a seating surface and a seat back 4 that forms a backrest. The seat back 4 is configured to be rotatable relative to the seat cushion 3 and maintainable at a predetermined angle.

The seat back 4 is coupled to the seat cushion 3 by the vehicle seat reclining device 10. The vehicle seat reclining device 10 maintains the seat back 4 relative to the seat cushion 3 at the predetermined angle.

Figure 2:
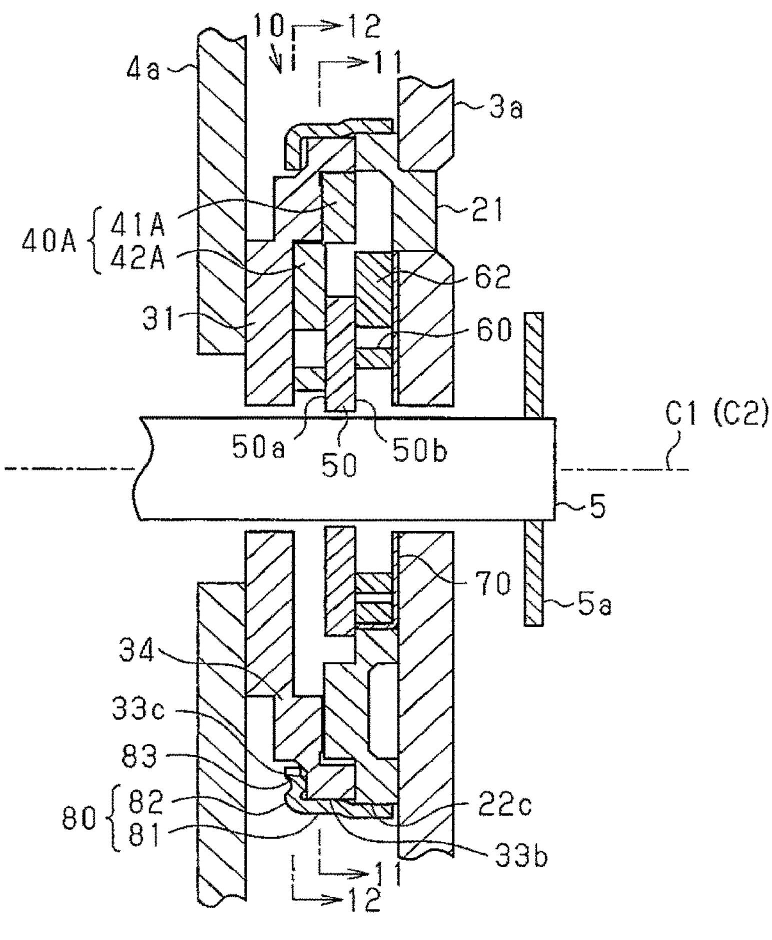
FIG. 2 is a cross-sectional view taken along line 2-2 in FIG. 1.

As shown in FIG. 2, a rotor that is one of first and second brackets 21 and 31 (described below) is fixed to a plate 3*a* coupled to the seat cushion 3, and a rotor that is the other one of the first and second brackets 21 and 31 is fixed to a plate 4*a* coupled to the seat back 4. In the first embodiment, the first bracket 21 is fixed to the plate 3*a*, and the second bracket 31 is fixed to the plate 4*a*.

A shaft 5 extends through a central portion of the vehicle seat reclining device 10. The shaft 5 operates a cam mechanism arranged in the vehicle seat reclining device 10. The shaft 5 includes an end to which an operation lever 5*a* is coupled. The operation lever 5*a* rotates the shaft 5.

When the vehicle seat reclining device 10 is coupled to the seat 2, a rotation axis C1 of the shaft 5 corresponds to a rotation axis C2 of the vehicle seat reclining device 10, that is, rotation axes of the first bracket 21 and the second bracket 31.

In the following description, the direction extending along a circumference about the rotation axis C2 of the vehicle seat reclining device 10 is referred to as the circumferential direction, and the direction perpendicular to the rotation axis C2 (normal direction) is referred to as the radial direction. Further, the direction in which the second bracket 31 rotates as the seat back 4 is reclined to the rear is referred to as the rear rotation direction RX (or "rotation in positive direction F"), and the direction opposite to the rear rotation direction RX is referred to as "rotation in negative direction N."

The structure of the vehicle seat reclining device 10 will now be described with reference to FIGS. 2 and 3.

Figure 3:
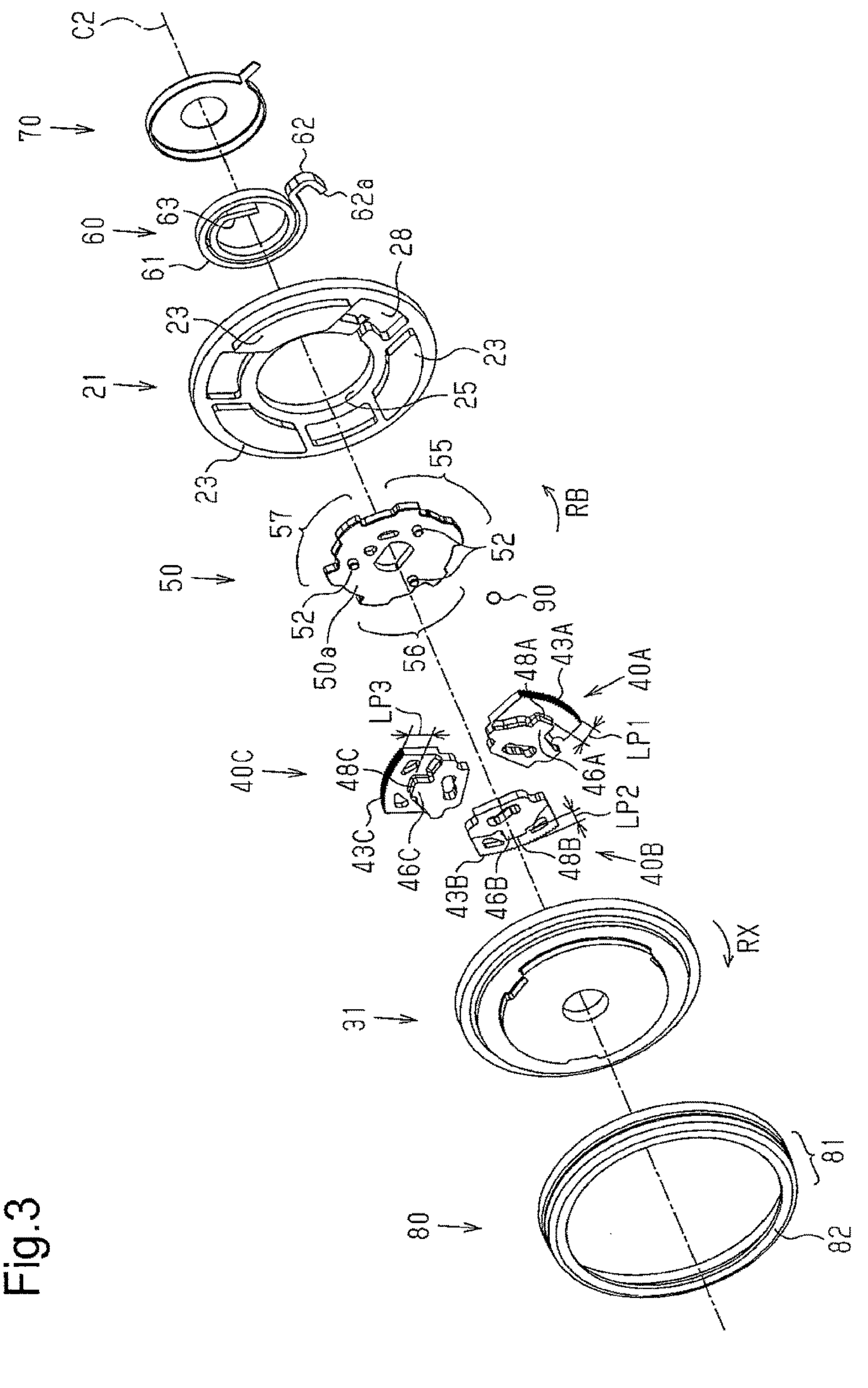
FIG. 3 is an exploded perspective view of the vehicle seat reclining device.

As shown in FIGS. 2 and 3, the vehicle seat reclining device 10 includes the first bracket 21, the second bracket 31, first to third pawls 40A to 40C, a cam 50, a spiral spring 60 that biases the cam 50, a cover 70 that covers the spiral spring 60, and a holding member 80 that holds the first and second brackets 21 and 31. Further, the vehicle seat reclining device 10 includes a ball cam 90 that restricts unnecessary movement of the first pawl 40A. The cam mechanism is formed by the cam 50, the spiral spring 60, the first to third pawls 40A to 40C, and the ball cam 90.

The holding member 80 includes an annular body 81 and a flange 82 extending from a rim of the body 81 toward the center. The flange 82 includes a projection 83 that projects toward the inner side (toward second bracket 31). The projection 83 adjusts play for axial movement of the second bracket 31.

The body 81 covers an outer circumferential surface 22*c* of the first bracket 21 and an outer circumferential surface 33*b* of the second bracket 31. The body 81 is laser-welded to the outer circumferential surface 22*c* of the first bracket 21. The flange 82 covers an outer surface 33*c* of an outer circumferential wall 33 of the second bracket 31. This allows the holding member 80 to maintain the distance between the first bracket 21 and the second bracket 31 in the axial direction at a predetermined distance and hold the first and second brackets 21 and 31.

The first bracket 21 will now be described with reference to FIGS. 4A and 4B.

Figure 4A:
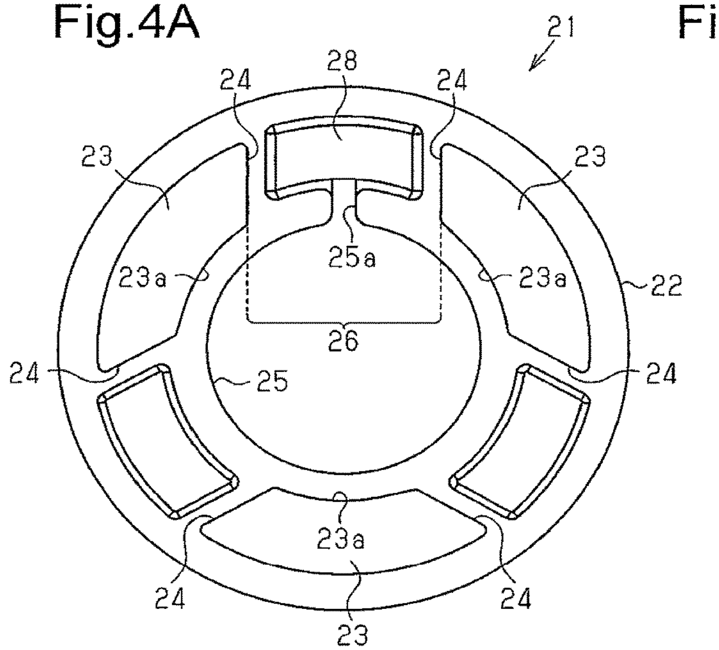
FIG. 4A is a plan view showing a first bracket.
Figure 4B:
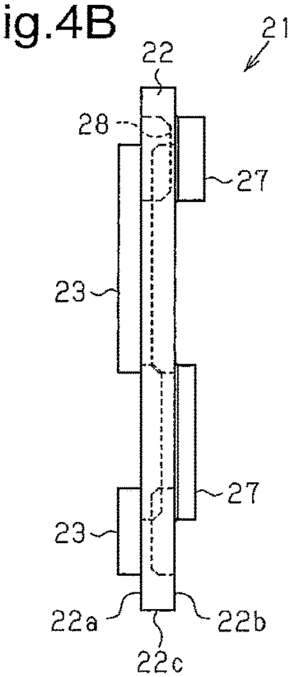
FIG. 4B is a side view showing the first bracket.

As shown in FIGS. 4A and 4B, the first bracket 21 includes a circular body 22, three guides 23 that guide movement of the pawls 40A to 40C, and projections 27 that couple the first bracket 21 to the plate 3*a*, which serves as a fixing member.

Each guide 23 projects from an inner surface 22*a* of the body 22. Each guide 23 includes guide surfaces 24 extending toward the outside and an inner surface 23*a* extending in the circumferential direction. The cam 50 is accommodated in a region surrounded by the inner surfaces 23*a* of the three guides 23.

The two opposing guide surfaces 24 of two adjacent guides 23 are parallel to each other. The guide surfaces 24 form guide grooves 26 in cooperation with the inner surface 22*a* of the body 22. The guide grooves 26 guide movement of the pawls 40A to 40C in the radial direction.

The three guides 23 are identical in shape and arranged in the circumferential direction at equal angles. Thus, the three guide grooves 26 are arranged in the circumferential direction at equal angular intervals. The first bracket 21 includes an outer surface 22*b* recessed at portions located at the opposite side of the guides 23.

The projections 27 project from portions of the outer surface 22*b* of the body 22 located at the opposite side of the guide grooves 26. The inner surface 22*a* of the first bracket 21 is recessed at the opposite side of the projections 27. The recess at the side opposite to one of the projections 27 is used as an accommodation recess 28 that accommodates an end 62*a* of an outer engagement portion 62 of the spiral spring 60.

When the first bracket 21 is coupled to a fixing member such as the plate 3*a*, the projections 27 of the first bracket 21 are fitted into holes or cutouts arranged in the fixing member and welded to the fixing member.

The central portion of the body 22 includes an accommodation portion 25 that accommodates a spiral portion 61 of the spiral spring 60. The accommodation portion 25 is connected to the accommodation recess 28 of the first bracket 21 by a communication groove 25*a*. The outer engagement portion 62 of the spiral spring 60 shown in FIG. 3 is engaged with the communication groove 25*a* and the accommodation recess 28.

The structure of the cam 50 will now be described with reference to FIGS. 2, 3, and 5.

Figure 5:
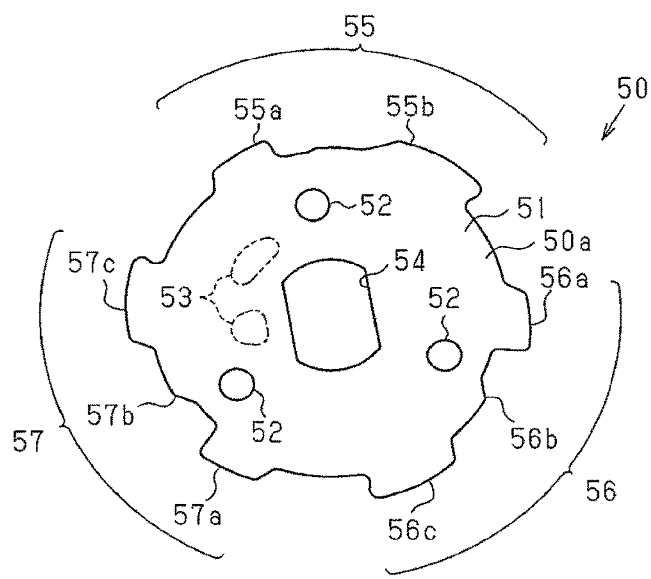
FIG. 5 is a plan view showing a cam.

As shown in FIGS. 2, 3, and 5, the cam 50 is located between the first bracket 21 and the second bracket 31. The cam 50 is accommodated in the region surrounded by the inner surfaces 23*a* of the three guides 23 of the first bracket 21.

The cam 50 includes a cam body 51, three pawl engagement portions 52, and two spring engagement portions 53 that engage an inner engagement portion 63 of the spiral spring 60 shown in FIG. 3. The three pawl engagement portions 52 engage the first to third pawls 40A to 40C, respectively. The pawl engagement portions 52 are arranged on a first surface 50*a* of the cam 50, and the spring engagement portions 53 are arranged on a second surface 50*b* of the cam 50, which is shown in FIG. 2.

A fitting hole 54 into which the shaft 5 is fitted extends through the central portion of the cam body 51. The cam 50 moves in cooperation with the rotation of the shaft 5. More specifically, operation of the operation lever 5*a* coupled to the shaft 5 rotates the cam 50.

The circumferential surface of the cam body 51 includes three cam portions, namely, a first cam portion 55, a second cam portion 56, and a third cam portion 57. The first to third cam portions 55 to 57 abut against cam surfaces of the pawls 40A to 40C and are arranged at equal angular intervals. The first cam portion 55 includes two pushing portions 55*a* and 55*b*, namely, the first pushing portion 55*a* and the second pushing portion 55*b*. The first pushing portion 55*a* and the second pushing portion 55*b* push a first cam surface 44A of the first pawl 40A. The second cam portion 56 includes three pushing portions 56*a*, 56*b*, and 56*c* that push a second cam surface 44B of the second pawl 40B. The third cam portion 57 includes three pushing portions 57*a*, 57*b*, and 57*c* that push a third cam surface 44C of the third pawl 40C. The third cam portion 57 has the same structure as the second cam portion 56.

The cam 50 is biased by the spiral spring 60 in a predetermined rotation direction relative to the first bracket 21 (hereinafter referred to as "biasing direction RB"). That is, the spiral spring 60 applies a biasing force that rotates the cam 50 in the biasing direction RB to the cam 50.

The first pawl 40A will now be described with reference to FIGS. 2, 6, and 10.

Figure 6:
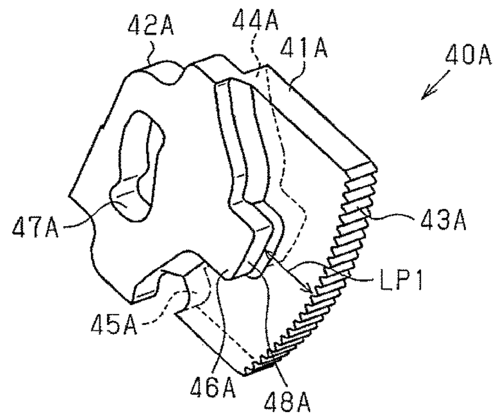
FIG. 6 is a perspective view showing a first pawl.
Figure 10:
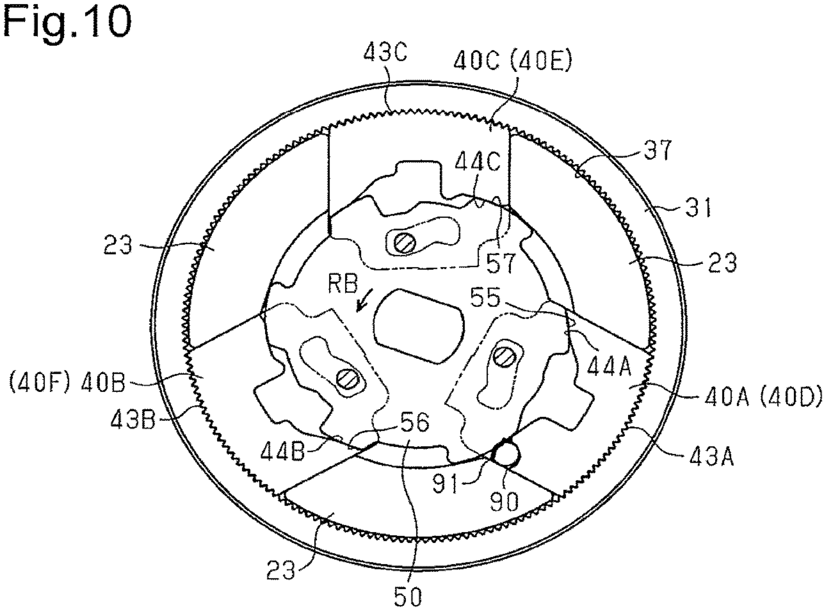
FIG. 10 is a cross-sectional view taken along line 11-11 in FIG. 2.

As shown in FIGS. 2, 6, and 10, the first pawl 40A includes a first block 41A and a second block 42A arranged in different steps. More specifically, the first block 41A is located at the radially outer side of the first pawl 40A, and the second block 42A is located at the radially inner side of the first pawl 40A. The first block 41A is shifted from the second block 42A in the axial direction of the rotation axis C2.

The first block 41A is attached to the guide grooves 26 of the first bracket 21. The first block 41A and the cam 50 are located at the same position in the axial direction of the rotation axis C2.

The first block 41A includes an arcuate outer end surface opposing inner teeth 37 of the second bracket 31. The outer end surface of the first block 41A includes outer teeth 43A that mesh with the inner teeth 37 of the second bracket 31.

The end surface of the first block 41A located at a side opposite to the outer end surface includes the first cam surface 44A against which the first cam portion 55 of the cam 50 abuts. The first cam surface 44A includes a portion against which the first pushing portion 55*a* of the first cam portion 55 abuts and a portion against which the second pushing portion 55*b* of the first cam portion 55 abuts.

The first block 41A includes an inner end surface including a recess curved surface 45A that accommodates the ball cam 90. The recess curved surface 45A extends continuously from the first cam surface 44A. The ball cam 90 is accommodated in a ball cam accommodation compartment 91 formed by the recess curved surface 45A of the first pawl 40A, the first cam portion 55 of the cam 50, and the guide surface 24 of the guide 23.

The second block 42A is arranged on the first surface 50*a* of the cam 50. That is, the second block 42A is located between the cam 50 and the second bracket 31. The second block 42A includes an outer end surface opposing the inner surface of a step 34 of the second bracket 31.

The outer end surface of the second block 42A includes a first limitation portion 46A. The first limitation portion 46A abuts against the first pawl restriction portion 34*a* of the second bracket 31 shown in FIG. 7A to limit movement of the first pawl 40A toward the radially outer side. The first limitation portion 46A includes an abutment surface 48A that abuts against a first inner surface 35*a* of the first pawl restriction portion 34*a*. The distance in the radial direction between the abutment surface 48A of the first limitation portion 46A and the outer teeth 43A is specified as a predetermined distance in relation to the step structure of the second bracket 31.

A cam hole 47A extends through the central portion of the second block 42A in the thickness-wise direction. The cam hole 47A extends in the circumferential direction toward the inner side in the biasing direction RB shown in FIG. 3. The corresponding pawl engagement portion 52 of the cam 50 is inserted through the cam hole 47A.

The second pawl 40B has the same structure as the first pawl 40A except in that the second pawl 40B does not include the recess curved surface 45A that accommodates the ball cam 90 and except for the positional structure of the second limitation portion 46B, that is, the positional relationship of an abutment surface 48B of the second limitation portion 46B and outer teeth 43B. The third pawl 40C has the same structure as the first pawl 40A except in that the third pawl 40C does not include the recess curved surface 45A and except for the positional structure of the third limitation portion 46C, that is, the positional relationship of an abutment surface 48C of the third limitation portion 46C and outer teeth 43C.

The second bracket 31 will now be described with reference to FIGS. 7A to 9.

Figure 7A:
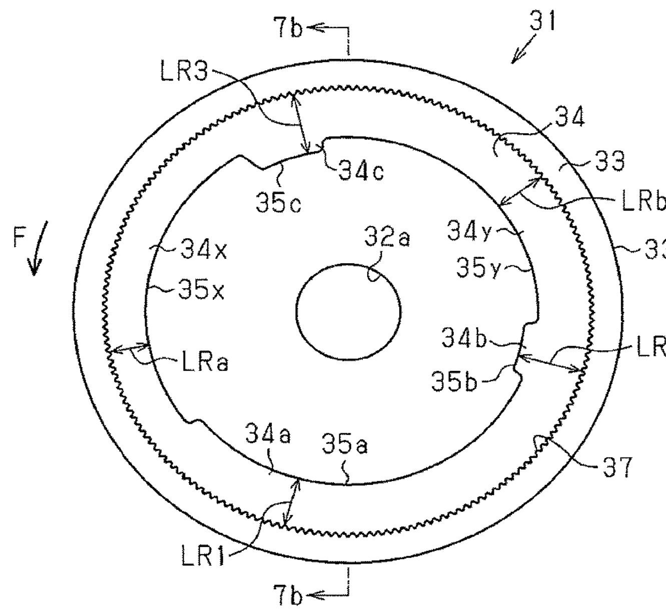
FIG. 7A is a plan view showing a second bracket.
Figure 7B:
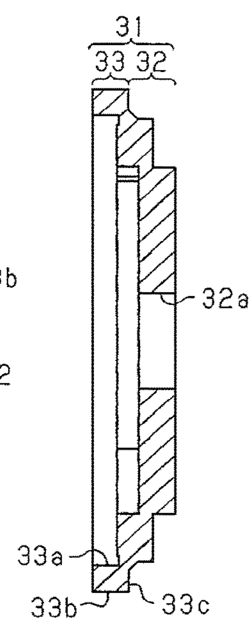
FIG. 7B is a cross-sectional view taken along line 7*b*-7*b* in FIG. 7A.

As shown in FIGS. 7A and 7B, the second bracket 31 includes a circular body 32 and an outer circumferential wall 33 arranged along an outer edge of the body 32. The body 32 includes an insertion hole 32*a* through which the shaft 5 is inserted.

The outer circumferential wall 33 includes an inner circumferential surface 33*a*. The inner teeth 37 that mesh with the outer teeth 43A to 43C of the first to third pawls 40A to 40C are arranged over the entire circumference of the inner circumferential surface 33*a*. The outer circumferential surface 33*b* of the outer circumferential wall 33 slides in contact with the holding member 80. The outer circumferential wall 33 includes an outer surface 33*c*. The outer surface 33*c* slides in contact with the projection 83 of the holding member 80 shown in FIG. 2. The inner surface of the body 32 includes the annular step 34 extending about the rotation axis C2.

Figure 8:
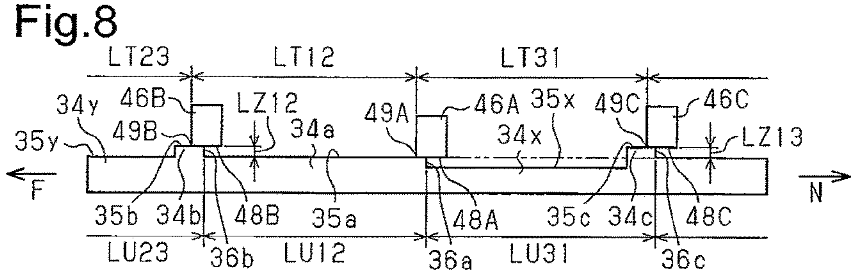
FIG. 8 is a net diagram showing a step of the second bracket.

In FIG. 8, the upper side is shown as the radially inner side of the second bracket 31, the lower side is shown as the radially outer side of the second bracket 31, and the sideward direction is shown as the circumferential direction of the second bracket 31. FIG. 8 corresponds to a schematic view in which the cross section along line 12-12 in FIG. 2 is spread out and the step 34 and the first to third limitation portions 46A to 46C of the pawls 40A to 40C are cut out.

The step 34 includes, sequentially in the positive direction F, a first pawl allowance portion 34*x*, the first pawl restriction portion 34*a*, a second pawl restriction portion 34*b*, a second pawl allowance portion 34*y*, and a third pawl restriction portion 34*c*.

The first pawl allowance portion 34*x* allows movement of the first pawl 40A toward the radially outer side. The first pawl allowance portion 34*x* includes an inner surface 35*x* having a predetermined radius, that is, a radius extending about the rotation axis C2.

The inner surface 35*x* of the first pawl allowance portion 34*x* is configured so that when the first pawl 40A moves toward the radially outer side with the first limitation portion 46A located on the first pawl allowance portion 34*x*, the first limitation portion 46A does not contact the inner surface 35*x* until the outer teeth 43A of the first pawl 40A mesh with the inner teeth 37. That is, the distance LRa between the inner teeth 37 of the second bracket 31 and the inner surface 35*x* of the first pawl allowance portion 34*x* shown in FIG. 7A is slightly less than or equal to the distance LP1 between the outer teeth 43A of the first pawl 40A and the abutment surface 48A of the first limitation portion 46A shown in FIG. 6.

The first pawl restriction portion 34*a* restricts movement of the first pawl 40A toward the radially outer side. The first pawl restriction portion 34*a* includes the first inner surface 35*a* having a smaller radius than the inner surface 35*x* of the first pawl allowance portion 34*x*. The first pawl restriction portion 34*a* extends in the positive direction F from the first pawl allowance portion 34*x* and is longer in the circumferential direction than the second pawl restriction portion 34*b*. More specifically, the first pawl restriction portion 34*a* extends to a negative direction end 36*b* of the second pawl restriction portion 34*b*.

The first inner surface 35*a* of the first pawl restriction portion 34*a* is configured so that when the first pawl 40A moves toward the radially outer side with the first limitation portion 46A located on the first pawl restriction portion 34*a*, the outer teeth 43A of the first pawl 40A are separated from the inner teeth 37 of the second bracket 31 in a state in which the first limitation portion 46A abuts against the first inner surface 35*a*.

The first inner surface 35*a* of the first pawl restriction portion 34*a* is configured so that when the second pawl 40B moves toward the radially outer side with the second limitation portion 46B located on the first pawl restriction portion 34*a*, the second limitation portion 46B does not contact the first inner surface 35*a* of the first pawl restriction portion 34*a* until the outer teeth 43B of the second pawl 40B mesh with the inner teeth 37.

More specifically, the distance LR1 between the inner teeth 37 of the second bracket 31 and the first inner surface 35*a* of the first pawl restriction portion 34*a* is longer than the distance LP1 between the outer teeth 43A of the first pawl 40A and the abutment surface 48A of the first limitation portion 46A and slightly less than or equal to the distance LP2 between the outer teeth 43B of the second pawl 40B and the abutment surface 48B of the second limitation portion 46B shown in FIG. 3.

The second pawl restriction portion 34*b* restricts movement of the second pawl 40B toward the radially outer side. The second pawl restriction portion 34*b* includes a second inner surface 35*b* having a smaller radius than the first inner surface 35*a* of the first pawl restriction portion 34*a*.

The second inner surface 35*b* of the second pawl restriction portion 34*b* is configured so that when the second pawl 40B moves toward the radially outer side with the second limitation portion 46D located on the second pawl restriction portion 34*b*, the outer teeth 43B of the second pawl 40B are separated from the inner teeth 37 of the second bracket 31 in a state in which the second limitation portion 46B abuts against the second inner surface 35*b*. That is, the distance LR2 between the inner teeth 37 of the second bracket 31 and the second inner surface 35*b* of the second pawl restriction portion 34*b* shown in FIG. 7A is longer than the distance LP2 between the outer teeth 43B of the second pawl 40B and the second limitation portion 46B.

The second pawl allowance portion 34*y* allows movement of the third pawl 40C toward the radially outer side. The second pawl allowance portion 34*y* includes an inner surface 35*y* having a larger radius than the second inner surface 35*b* of the second pawl restriction portion 34*b*.

The inner surface 35*y* of the second pawl allowance portion 34*y* is configured so that when the third pawl 40C moves toward the radially outer side with the third limitation portion 46C located on the second pawl allowance portion 34*y*, the third limitation portion 46C does not contact the inner surface 35*y* of the second pawl allowance portion 34*y* until the outer teeth 43C of the third pawl 40C mesh with the inner teeth 37. That is, the distance LRb between the inner teeth 37 of the second bracket 31 and the inner surface 35*y* of the second pawl allowance portion 34*y* shown in FIG. 7A is slightly less than or equal to the distance LP3 between the outer teeth 43C of the third pawl 40C and the abutment surface 48C of the third limitation portion 46C shown in FIG. 3.

The third pawl restriction portion 34*c* restricts movement of the third pawl 40C toward the radially outer side. The third pawl restriction portion 34*c* includes a third inner surface 35*c* having a smaller radius than the first inner surface 35*a* of the first pawl restriction portion 34*a*.

The third inner surface 35*c* of the third pawl restriction portion 34*c* is configured so that when the third pawl 40C moves toward the radially outer side with the third limitation portion 46C located on the third pawl restriction portion 34*c*, the outer teeth 43C of the third pawl 40C are separated from the inner teeth 37 of the second bracket 31 in a state in which the third limitation portion 46C abuts against the third inner surface 35*c*. That is, the distance LR3 between the inner teeth 37 of the second bracket 31 and the third inner surface 35*c* of the third pawl restriction portion 34*c* shown in FIG. 7A is longer than the distance LP3 between the outer teeth 43C of the third pawl 40C and the third limitation portion 46C.

The positional relationship of the first to third limitation portions 46A to 46C and the first to third pawl restriction portions 34*a* to 34*c* in the circumferential direction will now be described with reference to FIG. 8.

As shown in FIG. 8, the distance LT12 between a side surface of the first limitation portion 46A of the first pawl 40A facing the positive direction F and a side surface of the second limitation portion 46B of the second pawl 40B facing the positive direction F is equal to the distance LU12 between an end surface of the first pawl restriction portion 34*a* facing the negative direction N and an end surface of the second pawl restriction portion 34*b* facing the negative direction N.

The distance LT23 between a side surface of the second limitation portion 46B of the second pawl 40B facing the positive direction F and a side surface of the third limitation portion 46C of the third pawl 40C facing the positive direction F is equal to the distance LU23 between an end surface of the second pawl restriction portion 34*b* facing the negative direction N and an end surface of the third pawl restriction portion 34*c* facing the negative direction N.

The distance LT31 between a side surface of the third limitation portion 46C of the third pawl 40C facing the positive direction F and a side surface of the first limitation portion 46A of the first pawl 40A facing the positive direction F is equal to the distance LU31 between an end surface of the third pawl restriction portion 34*c* facing the negative direction N and an end surface of the first pawl restriction portion 34*a* facing the negative direction N. The distance relationship of the first to third limitation portions 46A to 46C and the first to third pawl restriction portions 34*a* to 34*c* in the circumferential direction are hereinafter referred to as the "circumferential structure of pawl movement limitation."

Figure 9:
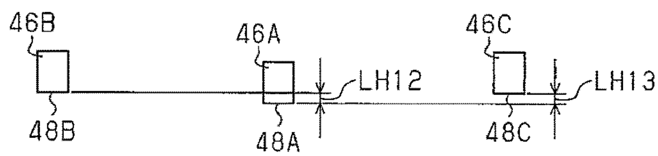
FIG. 9 is a schematic view showing the positional relationship of limitation portions of the first pawl, a second pawl, and a third pawl.

The positional relationship of the first to third limitation portions 46A to 46C in the radial direction will now be described with reference to FIG. 9. FIG. 9 only shows the first to third limitation portions 46A to 46C. FIG. 9 shows the positional relationship of the first to third limitation portions 46A to 46C in a state set by engagement with the cam 50 without force being applied to any of the first to third limitation portions 46A to 46C.

As shown in FIG. 9, the abutment surface 48A of the first limitation portion 46A is located at the radially outer side of the abutment surface 48B of the second limitation portion 46B. The separation distance LH12 between the abutment surface 48A of the first limitation portion 46A and the abutment surface 48B of the second limitation portion 46B is larger than the step distance LZ12 between the first inner surface 35*a* of the first pawl restriction portion 34*a* and the second inner surface 35*b* of the second pawl restriction portion 34*b*. The difference between the separation distance LH12 and the step distance LZ12 is set to a slight distance that can be cancelled by pushing force of external factors (described below).

The abutment surface 48A of the first limitation portion 46A is located at the radially outer side of the abutment surface 48C of the third limitation portion 46C. The separation distance LH13 between the abutment surface 48A of the first limitation portion 46A and the abutment surface 48C of the third limitation portion 46C is larger than the step distance LZ13 between the first inner surface 35*a* of the first pawl restriction portion 34*a* and the third inner surface 35*c* of the third pawl restriction portion 34*c*. The difference between the separation distance LH13 and the step distance LZ13 is set to a slight distance that can be cancelled by pushing force of external factors (described below).

The distance relationship of the first to third limitation portions 46A to 46C and the first to third pawl restriction portions 34*a* to 34*c* in the radial direction is hereinafter referred to as the "radial structure of pawl movement limitation." In the "circumferential structure of pawl movement limitation" and the "radial structure of pawl movement limitation," when the rotation angle of the second bracket 31 relative to the first bracket 21 is a predetermined value (hereinafter referred to as specified angle), positive direction corners 49A to 49C of the first to third limitation portions 46A to 46C may abut against the negative direction ends 36*a* to 36*c* of the first to third pawl restriction portions 34*a* to 34*c*, respectively.

Figure 11:
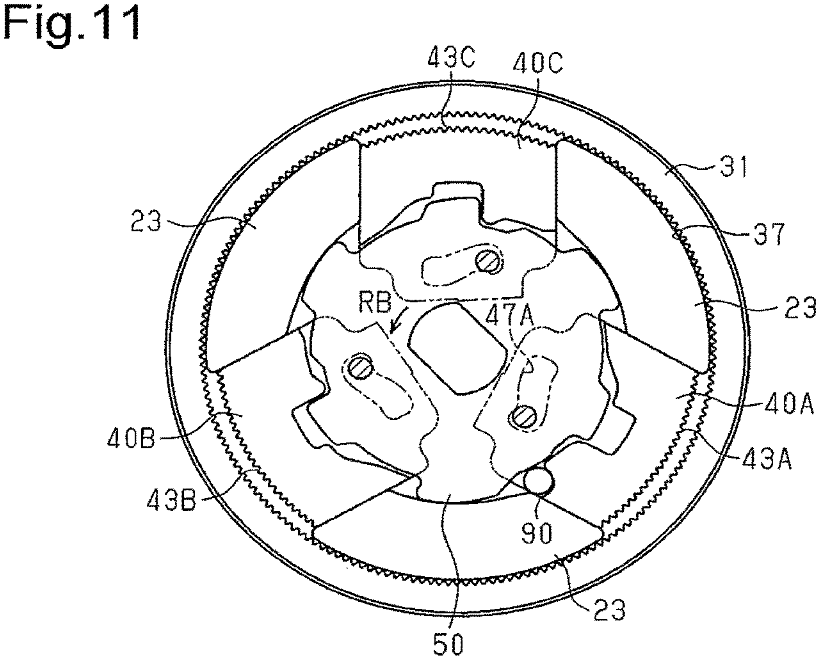
FIG. 11 is a cross-sectional view taken along line 11-11 in FIG. 2.
Figure 12:
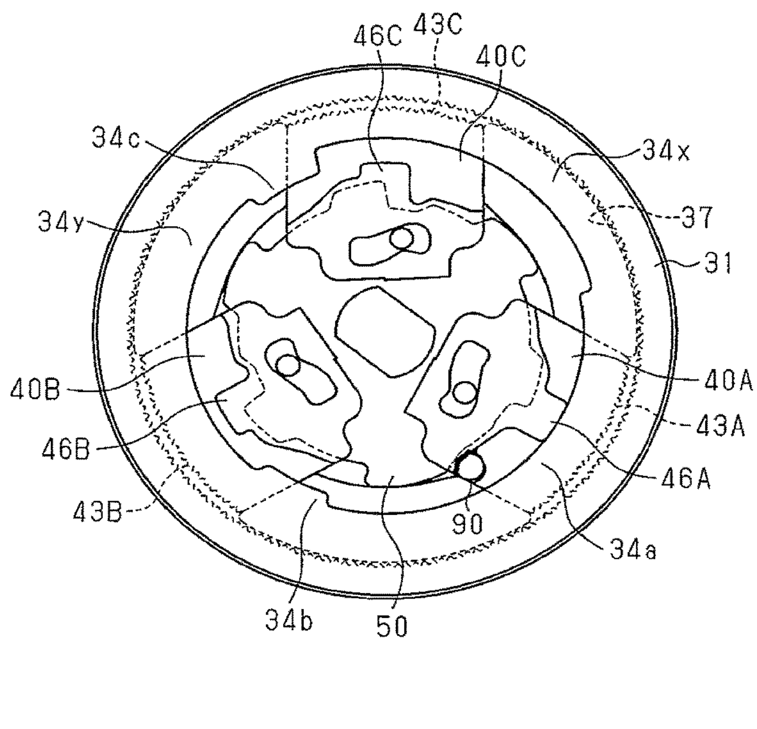
FIG. 12 is a cross-sectional view taken along line 12-12 in FIG. 2.

The action of the vehicle seat reclining device 10 will now be described with reference to FIGS. 10 to 12. FIG. 10 shows a locked state in which the outer teeth 43A to 43C of the pawls 40A to 40C are meshed with the inner teeth 37 of the second bracket 31. FIG. 11 shows an unlocked state in which the outer teeth 43A to 43C of the pawls 40A to 40C are not meshed with the inner teeth 37 of the second bracket 31 when the pawls 40A to 40C are held at the radially inner side. FIG. 12 shows a lock restriction state in which the outer teeth 43A to 43C of the pawls 40A to 40C do not mesh with the inner teeth 37 of the second bracket 31 when movement of the first pawl 40A toward the radially outer side is limited.

The vehicle seat reclining device 10 performs the two basic actions described below. The first basic action is an action of each of the pawls 40A to 40C when the operation lever 5*a* is operated to rotate the cam 50. The second basic action limits the movement of each of the pawls 40A to 40C controlled by the rotation angle of the second bracket 31. In the first basic action, the first to third pawls 40A to 40C act in the same manner. The first pawl 40A will now be described as an example.

The cam 50 is biased to rotate in the biasing direction RB. When the cam 50 rotates in the biasing direction RB, the first cam portion 55 pushes the first cam surface 44A of the first pawl 40A. This moves the first pawl 40A toward the radially outer side. As shown in FIG. 10, when the first cam portion 55 pushes the first pawl 40A toward the radially outer side, the outer teeth 43A of the first pawl 40A mesh with the inner teeth 37 of the second bracket 31. This fixes the second bracket 31 to the first bracket 21 and shifts the vehicle seat reclining device 10 to the locked state.

When the operation lever 5*a* is operated to rotate the cam 50 in the direction opposite to the biasing direction RB, the pawl engagement portion 52 of the cam 50 pushes the inner surface of the cam hole 47A of the first pawl 40A and thus moves the first pawl 40A toward the radially inner side. This separates the outer teeth 43A of the first pawl 40A from the inner teeth 37 of the second bracket 31 as shown in FIG. 11. As a result, the second bracket 31 becomes rotatable relative to the first bracket 21 and shifts the vehicle seat reclining device 10 to the unlocked state.

The second basic action will now be described with reference to FIG. 12.

As shown in FIG. 12, when the first pawl restriction portion 34*a* of the second bracket 31 is located at the first limitation portion 46A of the first pawl 40A, cancellation of the operation of the operation lever 5*a* rotates the cam 50 in the biasing direction RB. The rotation of the cam 50 moves the first pawl 40A toward the radially outer side so that the first limitation portion 46A of the first pawl 40A abuts against the first pawl restriction portion 34*a*. This stops movement of the first pawl 40A toward the radially outermost side. That is, when movement of the first pawl 40A in the radial direction is limited, the outer teeth 43A of the first pawl 40A remain separated from the inner teeth 37 of the second bracket 31. Further, abutment of the first limitation portion 46A of the first pawl 40A against the first pawl restriction portion 34*a* of the second bracket 31 stops rotation of the cam 50 and restricts movement of the second and third pawls 40B and 40C toward the outer side. This keeps the outer teeth 43B and 43C of the second and third pawls 40B and 40C separated from the inner teeth 37 of the second bracket 31. In such a manner, when the first pawl restriction portion 34*a* of the second bracket 31 is located at the first limitation portion 46A of the first pawl 40A, the vehicle seat reclining device 10 shifts to the lock restriction state in which locking of the vehicle seat reclining device 10 is limited, that is, a state in which rotation of the second bracket 31 is allowed.

The changes in the positional relationship of the first to third pawls 40A to 40C and the first to third pawl restriction portions 34*a* to 34*c* relative to rotation of the second bracket 31 will now be described with reference to FIGS. 13A to 13D.

FIG. 13A shows the positional relationship of the first to third limitation portions 46A to 46C of the first to third pawls 40A to 40C when the second bracket 31 is slightly rotated from the specified angle relative to the first bracket 21 in the positive direction F. The first limitation portion 46A of the first pawl 40A is located at the first pawl allowance portion 34*x*, the second limitation portion 46B of the second pawl 40B is located at the first pawl restriction portion 34*a*, and the third limitation portion 46C of the third pawl 40C is located at the second pawl allowance portion 34*y*. The first pawl allowance portion 34*x* allows movement of the first pawl 40A toward the radially outer side, the first pawl restriction portion 34*a* allows movement of the second pawl 40B toward the radially outer side, and the second pawl allowance portion 34*y* allows movement of the third pawl 40C toward the radially outer side. Thus, the vehicle seat reclining device 10 may shift to the locked state.

FIG. 13B shows the positional relationship of the first to third limitation portions 46A to 46C of the first to third pawls 40A to 40C when the second bracket 31 is rotated by the predetermined angle from the specified angle relative to the first bracket 21 in the positive direction F. The third limitation portion 46C of the third pawl 40C is in contact with an end of the second pawl restriction portion 34*b* facing the positive direction F. The relationship of the first to third limitation portions 46A to 46C of the first to third pawls 40A to 40C and the step 34 of the second bracket 31 is substantially equal to the relationship shown in FIG. 13A. Thus, the vehicle seat reclining device 10 may shift to the locked state.

FIG. 13C shows the positional relationship of the first to third limitation portions 46A to 46C of the first to third pawls 40A to 40C when the second bracket 31 is rotated slightly from the specified angle relative to the first bracket 21 in the negative direction N. The first limitation portion 46A of the first pawl 40A is located at the first pawl restriction portion 34*a* and is in contact with the first pawl restriction portion 34*a*. Thus, the vehicle seat reclining device 10 shifts to the lock restriction state. The second limitation portion 46B of the second pawl 40B is located at the second pawl restriction portion 34*b*, and the third limitation portion 46C of the third pawl 40C is located at the third pawl restriction portion 34*c*. The first pawl restriction portion 34*a* restricts movement of the first pawl 40A toward the radially outer side. The second limitation portion 46B of the second pawl 40B is not in contact with the second pawl restriction portion 34*b*. However, when an external factor (described below) applies a pushing force, the second pawl restriction portion 34*b* may restrict movement toward the radially outer side. The third limitation portion 46C of the third pawl 40C is not in contact with the third pawl restriction portion 34*c*. However, when the external factor applies the pushing force, the third pawl restriction portion 34*c* may restrict movement toward the radially outer side. To facilitate illustration, FIG. 13C shows that the second limitation portion 46B is in contact with the second pawl restriction portion 34*b* and the third limitation portion 46C is in contact with the third pawl restriction portion 34*c*. Nevertheless, as described above, each limitation portion is normally not in contact with the corresponding pawl restriction portion when the external factor does not apply the pushing force.

FIG. 13D shows the positional relationship of the first to third limitation portions 46A to 46C of the first to third pawls 40A to 40C when the second bracket 31 is rotated by the predetermined angle from the specified angle relative to the first bracket 21 in the negative direction N. The first limitation portion 46A of the first pawl 40A is located at the first pawl restriction portion 34*a*, and the side surface of the first limitation portion 46A of the first pawl 40A facing the positive direction is in contact with the second pawl restriction portion 34*b*. This restricts movement of the first pawl 40A toward the radially outer side and rotation of the second bracket 31 in the negative direction N. Further, when the restriction of the movement of the first pawl 40A toward the radially outer side stops rotation of the cam 50, movement of the second and third pawls 40B and 40C toward the radially outer side is restricted. In this manner, the vehicle seat reclining device 10 shifts to the lock restriction state.

A first effect of the step structure of the second bracket 31 will now be described with reference to FIG. 13C.

In the lock restriction state shown in FIG. 13C, the first limitation portion 46A of the first pawl 40A is in contact with the first pawl restriction portion 34*a*, and the second and third limitation portions 46B and 46C of the second and third pawls 40B and 40C may be separated from or slide in contact with the second and third pawl restriction portions 34*b* and 34*c*, respectively. When the second bracket 31 rotates in the positive direction F from the lock restriction state shown in FIG. 13C, the first limitation portion 46A of the first pawl 40A slides in contact with the first pawl restriction portion 34*a*. Continuous rotation of the second bracket 31 gradually decreases the contact area of the first limitation portion 46A of the first pawl 40A and the first pawl restriction portion 34*a*, the contactable area of the second limitation portion 46B of the second pawl 40B and the second pawl restriction portion 34*b*, and the contactable area of the third limitation portion 46C of the third pawl 40C and the third pawl restriction portion 34*c* in the same manner. The "circumferential structure of pawl movement limitation" and the "radial structure of pawl movement limitation" maintain a sliding contact state and a contactable state of the first to third pawls 40A to 40C and the first to third pawl restriction portions 34*a* to 34*c* until the second bracket 31 reaches the specified angle. When the rotation angle of the second bracket 31 becomes the specified angle, the positive direction corners 49A to 49C of the first to third limitation portions 46A to 46C may abut against the negative direction ends 36*a* to 36*c* of the first to third pawl restriction portions 34*a* to 34*c*, respectively.

In the contactable state of the second limitation portion 46B of the second pawl 40B, movement of the second pawl 40B toward the radially outer side allows the second limitation portion 46B of the second pawl 40B to contact the second pawl restriction portion 34*b*. The same applies to the contactable state of the third limitation portion 46C of the third pawl 40C. The contactable area of the second pawl 40B and the second pawl restriction portion 34*b* represents a contactable area when the second pawl 40B moves toward the radially outer side so that the second limitation portion 46B of the second pawl 40B contacts the second pawl restriction portion 34*b*. The same applies to the contactable area of the third pawl 40C and the third pawl restriction portion 34*c*.

When there is only one limitation portion like in the prior art structure, the pushing force of the cam 50 caused by external factors concentrates in a positive direction corner of the limitation portion when the second bracket 31 reaches the specified angle to reduce the contact area and the cam 50 is rotated by the external factors. Further, the cam 50 is biased by the spiral spring 60 in the biasing direction RB. Thus, when the second bracket 31 reaches the specified angle to reduce the contact area, the pushing force of the cam 50 based on the force of the spiral spring 60 concentrates in the positive direction corner of the limitation portion. In this regard, the above structure disperses the pushing force of the cam 50 to the three limitation portions 46A to 46C. This limits deformation of the first to third pawls 40A to 40C, in particular, deformation of the limitation portions 46A to 46C of the first to third pawls 40A to 40C.

The cam 50 is rotated by an external factor in the following case.

The vehicle seat reclining devices 10 are arranged at the left and right sides of the seat 2. The cams 50 of the left and right seat reclining devices 10 move in cooperation. Thus, the vehicle seat reclining devices 10 normally shift from the lock restriction state to the locked state at the same timing. However, on rare occasions, only one of the vehicle seat reclining devices 10 shifts to the locked state, and the other vehicle seat reclining device 10 is maintained in the lock restriction state. In this state, one of the vehicle seat reclining devices 10 fixes the seat back 4 to the seat cushion 3 to restrict rotation of the second bracket 31, and the other vehicle seat reclining device 10 is maintained in the lock restriction state. In the lock restriction state, the first bracket 21 and the second bracket 31 may rotate relatively, and the cams 50 rotate easily. Thus, swinging of the seat 2 in the front-to-rear direction, vibration of the vehicle, and the like slightly swing the operation lever 5*a*. The vehicle occupant pushes the operation lever 5*a* to limit swinging of the operation lever 5*a* and performs procedures in an order reversed from unlocking. This rotates the cam 50 in the biasing direction RB, which corresponds to the case in which the cam 50 is rotated by external factors. When such a pushing operation is performed, the pushing force that rotates the operation lever 5*a* is applied to the pawls through the cam 50. A biasing force of the spiral spring 60, that is, a larger force than the force normally applied to the cam 50, is applied to the pawls as the pushing force of external factors.

A second effect of the step structure of the second bracket 31 will now be described with reference to FIGS. 14 and 15.

FIG. 14 shows the step structure of the second bracket 31 in the prior art. In the conventional structure, pawl restriction portions 134*a* and pawl allowance portions 134*b* are alternately arranged in the circumferential direction in correspondence with limitation portions 146 of first to third pawls. In this case, the rim of the second bracket 31 is divided into three regions, and the pawl restriction portion 134*a* and the pawl allowance portion 134*b* are arranged at each region. Thus, the same effect as the first effect described above is obtained. However, the following problem occurs.

The range in which movement of the first to third pawls 40A to 40C toward the radially outer side is allowed at the step 34 of the second bracket 31 is defined as the "pawl movement allowance range AQ." The range in which movement of the first to third pawls 40A to 40C toward the radially outer side is restricted at the step 34 of the second bracket 31 is defined as the "pawl movement restriction range AP." The range that is the sum of the pawl movement allowance range AQ and the pawl movement restriction range AP is defined as the "control range AR." In the conventional structure, the control ranges AR of the first to third pawls 40A to 40C do not overlap. Thus, the rotation angle of the second bracket 31 corresponding to the control range AR (hereinafter referred to as control angle range) is virtually less than or equal to 120 degrees, and the control angle range cannot be greater than or equal to 120 degrees.

The control angle range that is greater than 120 degrees is effective for forming the vehicle seat reclining device 10 in the manner described below.

For example, when a reference position is set at a position where the seat back 4 is arranged perpendicular to the seat cushion 3, the vehicle seat reclining device 10 can be in the lock restriction state in the range from the reference position to 50 degrees in front of the seat back 4 and in the lock state in the range from the reference position to 80 degrees behind the seat back 4. In this case, the control angle range is 130 degrees, and the control angle range can be greater than or equal to 120 degrees. The vehicle seat reclining device 10 having the conventional structure shown in FIG. 14 cannot be used for a vehicle that requires such a specification.

Figure 15:
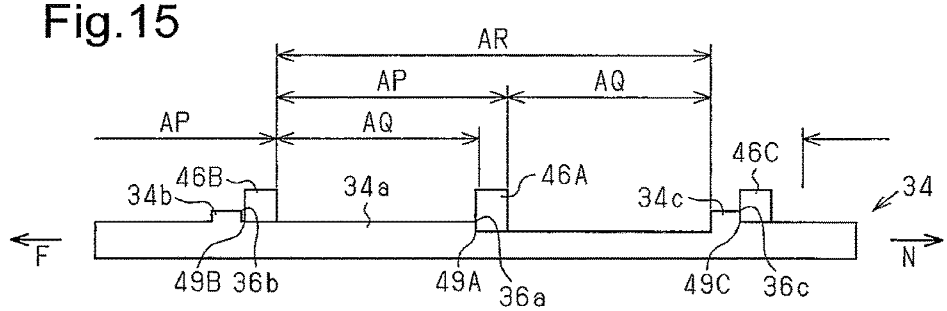
FIG. 15 is a net diagram showing the positional relationship of the pawl restriction portions and the limitation portions of the pawls in the second bracket of the vehicle seat reclining device of the first embodiment.

FIG. 15 shows the step structure of the second bracket 31 of the first embodiment.

The first pawl restriction portion 34*a* and the second pawl restriction portion 34*b* are located at different positions in the radial direction. Further, the first pawl restriction portion 34*a* of the second bracket 31 extends to the negative direction end 36*b* of the second pawl restriction portion 34*b*, which differs from the conventional structure. In this case, the pawl movement restriction range AP of the first pawl 40A overlaps the pawl movement restriction range AQ of the second pawl 40B (this structure is hereinafter referred to as overlapping structure of control range AR). This structure expands the control range AR and the control angle range of the second bracket 31 as compared with the conventional structure in which the pawl movement restriction range AP of the first pawl 40A does not overlap the pawl movement allowance range AQ of the second pawl 40B.

Further, the vehicle seat reclining device 10 has a third effect as described below.

As shown in FIG. 13A, when the vehicle seat reclining device 10 is in the locked state, the first to third limitation portions 46A to 46C are or may be respectively in contact with the first pawl allowance portion 34*x*, the first pawl restriction portion 34*a*, and the second pawl restriction portion 34*b*. That is, the first to third limitation portions 46A to 46C respectively contact the first pawl allowance portion 34*x*, the first pawl restriction portion 34*a*, and the second pawl restriction portion 34*b* when force is applied from the cam 50.

As shown in FIG. 13C, when the vehicle seat reclining device 10 is in the lock restriction state, only the first limitation portion 46A is in contact with the first pawl restriction portion 34*a*. When the first limitation portion 46A is in contact with the first pawl restriction portion 34*a*, movement of the second and third pawls 40B and 40C in the radial direction by the cam 50 is limited. Thus, the second and third pawls 40B and 40C of the second and third limitation portions 46B and 46C are not in contact with the step 34.

More specifically, as shown in FIG. 13A, when the vehicle seat reclining device 10 is in the locked state and excessive load may be applied to the first to third pawls 40A to 40C, the load is dispersed when the limitation portions 46A to 46C of the three pawls 40A to 40C are in contact with the step 34. As shown in FIG. 13C or 13D, when the vehicle seat reclining device 10 is in the lock restriction state so that excessive load is not applied to the first to third pawls 40A to 40C, the positions of the second and third pawls 40B and 40C in the radial direction are controlled by the cam 50 when the first pawl 40A is in contact with the step 34. In such a manner, in the first embodiment, the number of the limitation portions 46A to 46C that are in contact with the step 34 changes in accordance with whether the vehicle seat reclining device 10 is in the locked state or the lock restriction state (hereinafter referred to as limitation portion engagement structure). This structure expands the control angle and obtains strength for the locked state.

The advantages of the vehicle seat reclining device 10 of the first embodiment will now be described.

(1) The second bracket 31 includes the first and second pawl restriction portions 34*a* and 34*b* that restrict movement of the first and second pawls 40A and 40B in the radial direction. The second pawl restriction portion 34*b* is located toward the positive direction F and the radially inner side from the first pawl restriction portion 34*a*. When the rotation angle of the second bracket 31 relative to the first bracket 21 is the specified angle, the negative direction ends 36*a* and 36*b* of the first and second pawl restriction portions 34*a* and 34*b* are in contact with the positive direction corners 49A and 49B of the first and second limitation portions 46A and 46B of the first and second pawls 40A and 40B, respectively. Further, the first pawl restriction portion 34*a* allows movement of the second pawl 40B toward the radially outer side.

In this structure, when the second bracket 31 rotates in the positive direction F so that the rotation angle of the second bracket 31 relative to the first bracket 21 becomes the specified angle, the positive direction corners 49A and 49B of the first and second limitation portions 46A and 46B of the first and second pawls 40A and 40B may be in contact with the negative direction ends 36*a* and 36*b* of the first and second pawl restriction portions 34*a* and 34*b*, respectively. Thus, as compared with the conventional structure in which only a limitation portion of a single pawl is in contact with a pawl restriction portion when the rotation angle of the second bracket 31 relative to the first bracket 21 is the specified angle, the biasing force applied to the pawls 40A to 40C is dispersed in the first and second pawls 40A and 40B. This limits deformation of the first and second pawls 40A and 40B. In this case, the movement of the cam 50 includes movement of the first bracket 21 in the radial direction, the circumferential direction, the diametrical direction, and the like. Further, the first pawl restriction portion 34*a* allows movement of the second pawl 40B toward the radially outer side. Thus, since the second bracket 31 rotates at an angle at which the second pawl 40B and the first pawl restriction portion 34*a* oppose each other, movement of the second pawl 40B toward the radially outer side is allowed. This expands the control angle range of the second bracket 31.

(2) The first pawl restriction portion 34*a* extends in the positive direction F to the negative direction end 36*b* of the second pawl restriction portion 34*b*. The first pawl restriction portion 34*a* restricts movement of the first pawl 40A toward the radially outer side when the second bracket 31 is located toward the negative direction N from the specified angle and allows movement of the second pawl 40B toward the radially outer side when the second bracket 31 is located toward the positive direction F from the specified angle. This structure restricts movement of the first pawl 40A toward the radially outer side over a broader range than the conventional technique in which the pawl allowance portion 134*b* that allows movement of the pawls toward the radially outer side is arranged between the two pawl restriction portions 134*a*. This expands the control angle range of the second bracket 31.

(3) The second bracket 31 further includes the third pawl restriction portion 34*c*. The third pawl restriction portion 34*c* is located toward the positive direction F from the second pawl restriction portion 34*b* and at the same position in the radial direction. When the rotation angle of the second bracket 31 relative to the first bracket 21 is the specified angle, the negative direction end 36*c* of the third pawl restriction portion 34*c* is arranged to contact the positive direction corner 49C of the third limitation portion 46C of the third pawl 40C. In this structure, when the second bracket 31 rotates in the positive direction F so that the rotation angle of the second bracket 31 relative to the first bracket 21 becomes the specified angle, the positive direction corners 49A to 49C of the first to third limitation portions 46A to 46C of the first to third pawls 40A to 40C may be in contact with the negative direction ends 36*a* to 36*c* of the first to third pawl restriction portions 34*a* to 34*c*, respectively. Thus, as compared with the conventional structure in which only a limitation portion of a single pawl is in contact with a pawl restriction portion when the rotation angle of the second bracket 31 relative to the first bracket 21 is the specified angle, deformation of the first to third pawls 40A and 40C, in particular, the first to third limitation portions 46A to 46C, is limited.

Second Embodiment

A second embodiment of a vehicle seat reclining device 10 will now be described with reference to FIGS. 10 and 16A to 16D.

The vehicle seat reclining device 10 of the second embodiment differs from that of the first embodiment in the structure of the second bracket 31. In the second embodiment, like or same reference numerals are given to those components that are the same as the corresponding components of the first embodiment. Further, while the step structure in which the second pawl 40B is located toward the positive direction F from the first pawl 40A has been described in the first embodiment, a step structure in which a second pawl 40E is located toward the negative direction N from a first pawl 40D will now be described in the second embodiment.

As shown in FIG. 10, the first pawl 40D, the second pawl 40E, and a third pawl 40F are located at positions corresponding to the first pawl 40A, the third pawl 40C, and the second pawl 40B of the first embodiment, respectively.

Figure 16A:
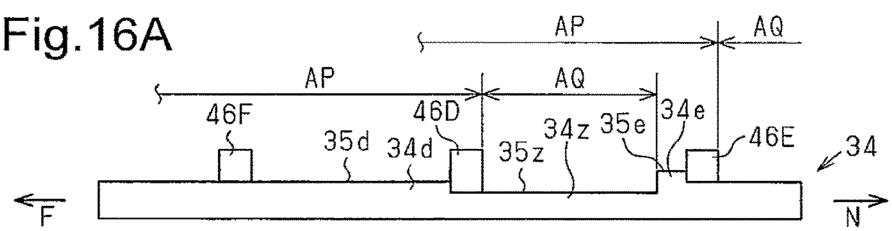
FIGS. 16A to 16D are net diagrams showing changes in the positional relationship of limitation portions of pawls and pawl restriction portions relative to rotation of the second bracket in a second embodiment of a vehicle seat reclining device.
Figure 16B:
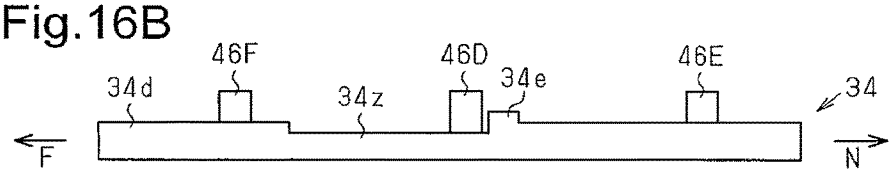
Figure 16C:
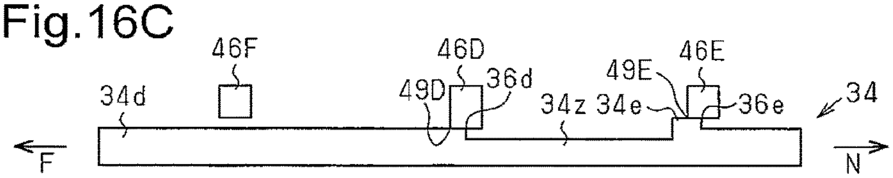
Figure 16D:
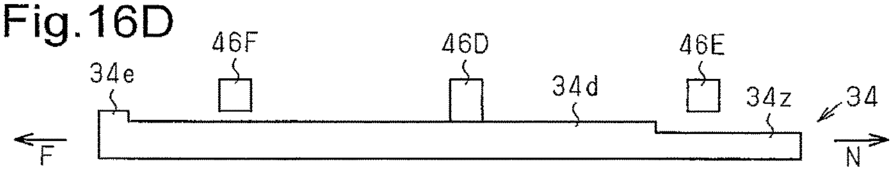

FIG. 16A shows the arrangement of first to third limitation portions 46D to 46F of the first to third pawls 40D to 40F when the second bracket 31 slightly rotates from the specified angle in the positive direction F relative to the first bracket 21. FIG. 16B shows the arrangement of the first to third limitation portions 46D to 46F of the first to third pawls 40D to 40F when the second bracket 31 rotates by the predetermined angle from the specified angle in the positive direction F relative to the first bracket 21. FIG. 16C shows the arrangement of the first to third limitation portions 46D to 46F of the first to third pawls 40D to 40F when the second bracket 31 slightly rotates from the specified angle in the negative direction N relative to the first bracket 21. FIG. 16D shows the arrangement of the first to third limitation portions 46D to 46F of the first to third pawls 40D to 40F when the second bracket 31 rotates by the predetermined angle from the specified angle in the negative direction N relative to the first bracket 21.

As shown in FIG. 16A, the step 34 includes, sequentially in the positive direction F, a first pawl allowance portion 34*z*, a first pawl restriction portion 34*d*, and a second pawl restriction portion 34*e*. The first pawl allowance portion 34*z* allows movement of the first pawl 40D toward the radially outer side. The first pawl allowance portion 34*z* includes an inner surface 35*z* having a predetermined radius.

The inner surface 35*z* of the first pawl allowance portion 34*z* is configured so that when the first pawl 40D moves toward the radially outer side with the first limitation portion 46D located on the first pawl allowance portion 34*z*, the first limitation portion 46D does not contact the inner surface 35*z* of the first pawl allowance portion 34*z* until outer teeth of the first pawl 40D mesh with the inner teeth 37.

The first pawl restriction portion 34*d* restricts movement of the first pawl 40D toward the radially outer side. The first pawl restriction portion 34*d* extends from the first pawl allowance portion 34*z* in the positive direction F and is longer in the circumferential direction than the second pawl restriction portion 34*e*. For example, the length of the first pawl restriction portion 34*d* in the circumferential direction is specified as a length that is greater than or equal to a length corresponding to the angle of the first pawl 40D and the second pawl 40E (angle exceeding 180 degrees).

Further, the first pawl restriction portion 34*d* includes a first inner surface 35*d* having a smaller radius than the inner surface 35*z* of the first pawl allowance portion 34*z*. The first inner surface 35*d* of the first pawl restriction portion 34*d* is configured so that when the first pawl 40D moves toward the radially outer side with the first limitation portion 46D located on the first pawl restriction portion 34*d*, the outer teeth of the first pawl 40D are separated from the inner teeth 37 of the second bracket 31 in a state in which the first limitation portion 46D abuts against the first inner surface 35*d*.

The first inner surface 35*d* of the first pawl restriction portion 34*d* is configured so that when the third pawl 40F moves toward the radially outer side with the third limitation portion 46F located on the first pawl restriction portion 34*d*, the third limitation portion 46F does not contact the first inner surface 35*d* of the first pawl restriction portion 34*d* until the outer teeth of the third pawl 40F mesh with the inner teeth 37.

The first inner surface 35*d* of the first pawl restriction portion 34*d* is configured so that when the second pawl 40E moves toward the radially outer side with the second limitation portion 46E located on the first pawl restriction portion 34*d*, the second limitation portion 46E does not contact the first inner surface 35*d* of the first pawl restriction portion 34*d* until the outer teeth of the second pawl 40E mesh with the inner teeth 37.

The second pawl restriction portion 34*e* restricts movement of the second pawl 40E toward the radially outer side. The second pawl restriction portion 34*e* includes a second inner surface 35*e* having a smaller radius than the first inner surface 35*d* of the first pawl restriction portion 34*d*. The second inner surface 35*e* of the second pawl restriction portion 34*e* is configured so that when the second pawl 40E moves toward the radially outer side with the second limitation portion 46E located on the second pawl restriction portion 34*e*, the outer teeth of the second pawl 40E are separated from the inner teeth 37 of the second bracket 31 in a state in which the second limitation portion 46E abuts against the second inner surface 35*e*.

The distance relationship of the first and second limitation portions 46D and 46E and the first and second pawl restriction portions 34*d* and 34*e* in the circumferential direction is the same as the distance relationship of the first and third limitation portions 46A and 46C and the first and third pawl restriction portions 34*a* and 34*c* in the circumferential direction in the first embodiment.

The distance relationship of the first and second limitation portions 46D and 46E and the first and second pawl restriction portions 34*d* and 34*e* in the radial direction is the same as the distance relationship of the first and third limitation portions 46A and 46C and the first and third pawl restriction portions 34*a* and 34*c* in the radial direction in the first embodiment.

Thus, the second embodiment has the same effect as the first effect of the first embodiment. However, as shown in FIG. 16C, the second embodiment differs from the first embodiment in that the first pawl 40D and the second pawl 40E are respectively in contact with the first pawl restriction portion 34*d* and the second pawl restriction portion 34*e* but the third pawl 40F is not in contact with the step 34 when the rotation angle of the second bracket 31 is the specified angle.

Further, in the structure of the step 34, the first pawl restriction portion 34*d* and the second pawl restriction portion 34*e* are located at different positions in the radial direction. Further, the first pawl restriction portion 34*d* extends from the second pawl restriction portion 34*e* in the negative direction N and is longer in the circumferential direction than the second pawl restriction portion 34*e*. Thus, as shown in FIG. 16D, when the second bracket 31 rotates, the second limitation portion 46E of the second pawl 40E is arranged at the first pawl allowance portion 34*z*. This indicates that the pawl movement allowance range AQ of the first pawl 40D overlaps the pawl movement restriction range AP of the second pawl 40E as shown in FIG. 16A.

The vehicle seat reclining device 10 of the second embodiment has the "overlapping structure of control range AR" in the same manner as the first embodiment. This expands the control angle range of the second bracket 31 as compared with the conventional structure. Further, the second embodiment has the limitation portion engagement structure in the same manner as the first embodiment. This expands the control angle and obtains the strength for the locked state.

The advantage of the vehicle seat reclining device 10 of the second embodiment will now be described.

(1) The second bracket 31 includes the first and second pawl restriction portions 34*d* and 34*e* arranged in correspondence with the first and second pawls 40D and 40E. The first and second pawl restriction portions 34*d* and 34*e* engage the first and second limitation portions 46D and 46E to restrict movement of the first and second pawls 40D and 40E in the radial direction. The second pawl restriction portion 34*e* is located toward the negative direction N from the first pawl restriction portion 34*d*. When the rotation angle of the second bracket 31 relative to the first bracket 21 is the specified angle, the negative direction ends 36*d* and 36*e* of the first and second pawl restriction portions 34*d* and 34*e* are arranged to contact the positive direction corners 49D and 49E of the first and second limitation portions 46D and 46E of the first and second pawls 40D and 40E. Further, the first pawl restriction portion 34*d* extends from the first pawl allowance portion 34*z* in the positive direction F and is longer in the circumferential direction than the second pawl restriction portion 34*e*.

In this structure, when the second bracket 31 rotates in the positive direction F so that the rotation angle relative to the first bracket 21 becomes the specified angle, the positive direction corners 49D and 49E of the first and second limitation portions 46D and 46E of the first and second pawls 40D and 40E may be in contact with the negative direction ends 36*d* and 36*e* of the first and second pawl restriction portions 34*d* and 34*e*, respectively. Thus, as compared with the conventional structure in which only a limitation portion of a single pawl is in contact with a pawl restriction portion when the rotation angle of the second bracket 31 relative to the first bracket 21 is the specified angle, the biasing force applied to the pawls is dispersed in the first and second pawls 40D and 40E. This limits deformation of the first and second pawls 40D and 40E, in particular, the first and second limitation portions 46D and 46E.

Further, the first pawl restriction portion 34*d* is longer in the circumferential direction than the second pawl restriction portion 34*e*. Thus, movement of the second pawl 40E toward the radially outer side is restricted over a broader range than the range in which the second pawl 40E may be in contact with the second pawl restriction portion 34*e*. This is because the cam 50 moves the first pawl 40D and the second pawl 40E in cooperation in the radial direction. In the conventional structure, movement of the second pawl 40E toward the radially outer side is restricted only in the range in which the second pawl 40E may be in contact with the second pawl restriction portion 34*e*. Accordingly, the above structure expands the control angle range of the second bracket 31 as compared with the conventional structure.

Modified Examples of First Embodiment

Figure 17:
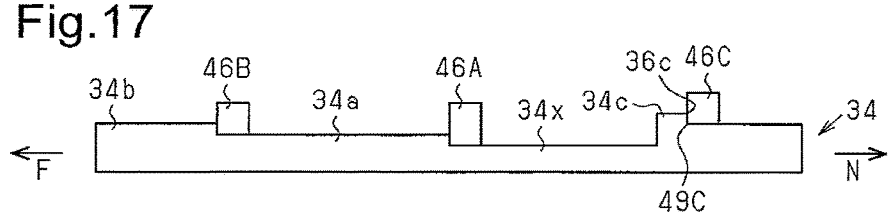
FIG. 17 is a net diagram showing the positional relationship of pawl restriction portions and limitation portions of pawls in the second bracket in a first modified example of the first embodiment.

A first modified example of the vehicle seat reclining device 10 of the first embodiment will now be described with reference to FIG. 17.

In this example, the structure in which the first limitation portion 46A and the second limitation portion 46B are respectively in contact with the first pawl restriction portion 34*a* and the second pawl restriction portion 34*b* in the radial direction in the first embodiment is applied to the structure in which the second limitation portion 46B and the third limitation portion 46C are respectively in contact with the second pawl restriction portion 34*b* and the third pawl restriction portion 34*c* in the radial direction.

More specifically, the third pawl restriction portion 34*c* is located toward the positive direction F and the radially inner side from the second pawl restriction portion 34*b*. The negative direction end 36*c* of the third pawl restriction portion 34*c* is arranged to contact the positive direction corner 49C of the third limitation portion 46C of the third pawl 40C when the rotation angle of the second bracket 31 relative to the first bracket 21 is the specified angle. Further, the position of the third pawl 40C is located at the inner side of the position in the first embodiment. This structure has virtually the same advantage as the first embodiment.

Figure 18:
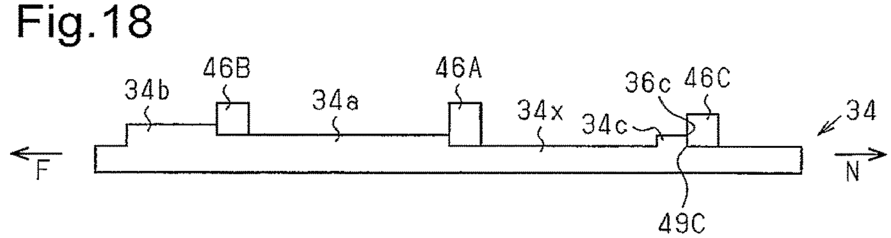
FIG. 18 is a net diagram showing the positional relationship of pawl restriction portions and limitation portions of pawls in the second bracket in a second modified example of the first embodiment.

A second modified example of the vehicle seat reclining device 10 of the first embodiment will now be described with reference to FIG. 18.

In this example, the third pawl restriction portion 34*c* is located toward the positive direction F and the radially outer side from the second pawl restriction portion 34*b*. The negative direction end 36*c* of the third pawl restriction portion 34*c* is arranged to contact the positive direction corner 49C of the third limitation portion 46C of the third pawl 40C when the rotation angle of the second bracket 31 relative to the first bracket 21 is the specified angle. Further, the position of the third pawl 40C is located at the outer side of the position in the first embodiment. This structure has virtually the same advantage as the first embodiment.

A third modified example of the vehicle seat reclining device 10 of the first embodiment will now be described with reference to FIG. 19.

Figure 19:
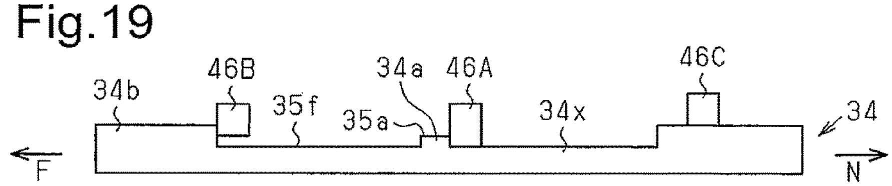
FIG. 19 is a net diagram showing the positional relationship of pawl restriction portions and limitation portions of pawls in the second bracket in a third modified example of the first embodiment.

To facilitate illustration, FIG. 19 shows that the first limitation portion 46A is in contact with the first pawl allowance portion 34*x* and the third limitation portion 46C is in contact with the second pawl restriction portion 34*b*. However, they are not virtually in contact with each other (the same applies to FIG. 20).

In this example, the length of the first pawl restriction portion 34*a* is smaller than the length of the first pawl restriction portion 34*a* of the first embodiment. An inner surface 35*f* from the first pawl restriction portion 34*a* to the second pawl restriction portion 34*b* in the positive direction F is located at the radially outer side of the first inner surface 35*a* of the first pawl restriction portion 34*a*. The second pawl restriction portion 34*b* extends toward the third pawl 40C in the negative direction N. The third pawl restriction portion 34*c* is not shown.

For example, the length of the second pawl restriction portion 34*b* in the circumferential direction is specified as a length that is greater than or equal to a length corresponding to the angle of the second pawl 40B and the third pawl 40C (angle exceeding 180 degrees). The second pawl restriction portion 34*b* restricts movement of the second pawl 40B toward the radially outer side when the second bracket 31 is located toward the negative direction N from the specified angle and allows movement of the third pawl 40C toward the radially outer side when the second bracket 31 is located toward the positive direction F from the specified angle.

In the first embodiment, the structure in which the first pawl restriction portion 34*a* extends expands the range in which the first pawl 40A is in contact with the first pawl restriction portion 34*a*. In this regard, in this example, instead of the structure in which the first pawl restriction portion 34*a* extends, the second pawl restriction portion 34*b* extends. This expands the range in which the second pawl 40B is in contact with the second pawl restriction portion 34*b*.

The engagement relationship of the first pawl 40A and the second pawl 40B and the first pawl restriction portion 34*a* and the second pawl restriction portion 34*b*, in particular, the engagement relationship near the specified angle, is the same as the vehicle seat reclining device 10 of the first embodiment.

The above structure restricts movement of the second pawl 40B toward the radially outer side over a broader range than the conventional technique in which the pawl allowance portion 134*b* that allows movement of the pawls toward the radially outer side is arranged between the two pawl restriction portions 134*a*. This expands the control angle range of the second bracket 31.

In this modified example, the third pawl restriction portion 34*c* is omitted. Thus, the modified example differs from the first embodiment in that when the rotation angle of the second bracket 31 is the specified angle, the first pawl 40A and the second pawl 40B may be in contact with the first pawl restriction portion 34*a* and the second pawl restriction portion 34*b* and the third pawl 40C is not in contact with the step 34. Accordingly, the biasing force to the pawls are dispersed in the first and second pawls 40A and 40B as compared with the conventional structure in which only a limitation portion of a single pawl is in contact with a pawl restriction portion when the rotation angle of the second bracket 31 is the specified angle. This limits deformation of the first and second pawls 40A and 40B.

Figure 20:
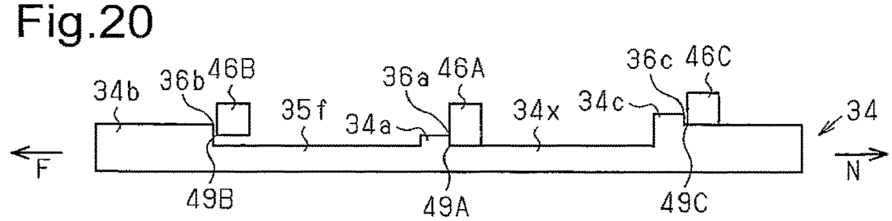
FIG. 20 is a net diagram showing the positional relationship of pawl restriction portions and limitation portions of pawls in the second bracket in a fourth modified example of the first embodiment.

A fourth modified example of the vehicle seat reclining device 10 of the first embodiment will now be described with reference to FIG. 20.

In this modified example, the third pawl restriction portion 34*c* is added to the third modified example. More specifically, the third pawl restriction portion 34*c* is located toward the positive direction F and the radially inner side from the second pawl restriction portion 34*b*. The negative direction end 36*c* of the third pawl restriction portion 34*c* is arranged to contact the positive direction corner 49C of the third limitation portion 46C of the third pawl 40C when the rotation angle of the second bracket 31 relative to the first bracket 21 is the specified angle.

In this structure, when the second bracket 31 rotates in the positive direction F so that the rotation angle of the second bracket 31 relative to the first bracket 21 becomes the specified angle, the positive direction corners 49A to 49C of the first to third limitation portions 46A to 46C of the first to third pawls 40A to 40C may be in contact with the negative direction ends 36*a* to 36*c* of the first to third pawl restriction portions 34*a* to 34*c*. Thus, when the rotation angle of the second bracket 31 relative to the first bracket 21 is the specified angle, deformation of the first to third pawls 40A to 40C is limited as compared with the conventional structure in which only a limitation portion of a single pawl is in contact with a pawl restriction portion.

Third Embodiment

A third embodiment of a vehicle seat reclining device 10 will now be described with reference to FIGS. 21 and 23B.

The vehicle seat reclining device 10 of the third embodiment includes four pawls, namely, first to fourth pawls 140A to 140D. The first to fourth pawls 140A to 140D have the same structure as the pawl structure shown in the first embodiment. The second bracket 31 includes a step 234 having the “circumferential structure of pawl movement limitation,” the “radial structure of pawl movement limitation,” and the “overlapping structure of control range.”

The first to fourth pawls 140A to 140D are arranged sequentially in the positive direction F in the order of the first to fourth pawls 140A to 140D. The first to fourth pawls 140A to 140D include first to fourth limitation portions 246A to 246D, respectively. The first limitation portion 246A is located at the radially outermost side among the first to fourth limitation portions 246A to 246D. The second limitation portion 246B and the fourth limitation portion 246D are located at the radially innermost side among the first to fourth limitation portions 246A to 246D. The third limitation portion 246C is located at the same position in the radial direction as the first limitation portion 246A or located at a slightly outer side of the first limitation portion 246A and at a slightly inner side of the second limitation portion 246B.

Figure 23A:
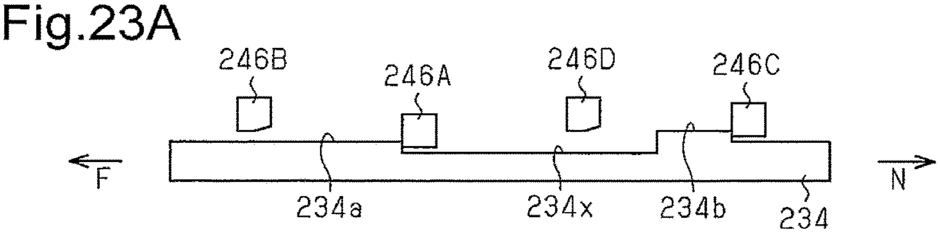
FIGS. 23A and 23B are net diagrams showing changes in the positional relationship of limitation portions of pawls and pawl restriction portions relative to rotation of the second bracket in the vehicle seat reclining device of the third embodiment.

As shown in FIG. 23A, the step 234 includes a first pawl restriction portion 234*a*, a second pawl restriction portion 234*b*, and a first pawl allowance portion 234*x*. The first pawl restriction portion 234*a*, the second pawl restriction portion 234*b*, and the first pawl allowance portion 234*x* are sequentially arranged in the positive direction F in the order of the first pawl restriction portion 234*a*, the second pawl restriction portion 234*b*, and the first pawl allowance portion 234*x*. The second pawl restriction portion 234*b* is located at the radially inner side of the first pawl restriction portion 234*a*.

The first pawl allowance portion 234*x* allows movement of the first pawl 140A toward the radially outer side. The first pawl allowance portion 234*x* does not stop movement of any of the second to fourth pawls 140B to 140D toward the radially outer side.

The first pawl restriction portion 234*a* restricts movement of the first pawl 140A toward the radially outer side so that outer teeth 143A of the first pawl 140A do not mesh with the inner teeth of the second bracket 31. The first pawl restriction portion 234*a* does not stop movement of any of the second to fourth pawls 140B to 140D toward the radially outer side.

The second pawl restriction portion 234*b* restricts movement of the third pawl 140C toward the radially outer side so that outer teeth 143C of the third pawl 140C do not mesh with the inner teeth of the second bracket 31. The second pawl restriction portion 234*b* does not stop movement of any of the second and fourth pawls 140B and 140D toward the radially outer side.

As described above, the second limitation portion 246B does not virtually function to limit movement of the second pawl 140B toward the radially outer side, and the fourth limitation portion 246D does not virtually function to limit movement of the fourth pawl 140D toward the radially outer side.

Thus, when the first pawl 140A of the third embodiment corresponds to the first pawl 40A of the first embodiment, the third pawl 140C of the third embodiment can be regarded as the second pawl 40B of the first embodiment. The structure of the positional relationship of the first and second limitation portions 46A and 46B and the first and second pawl restriction portions 34*a* and 34*b* in the first embodiment may be applied to the structure of the positional relationship of the first and third pawls 140A and 140C and the first and second pawl restriction portions 234*a* and 234*b* in the third embodiment.

Further, regarding the relationship with the second embodiment, when the first pawl 140A of the third embodiment corresponds to the first pawl 40D of the second embodiment, the third pawl 140C of the third embodiment can correspond to the second pawl 40E of the second embodiment. That is, the structure of the positional relationship of the first and second limitation portions 46D and 46E and the first and second pawl restriction portions 34*d* and 34*e* may be applied to the structure of the positional relationship of the first and third pawls 140A and 140C and the first and second pawl restriction portions 234*a* and 234*b* in the third embodiment.

Figure 21:
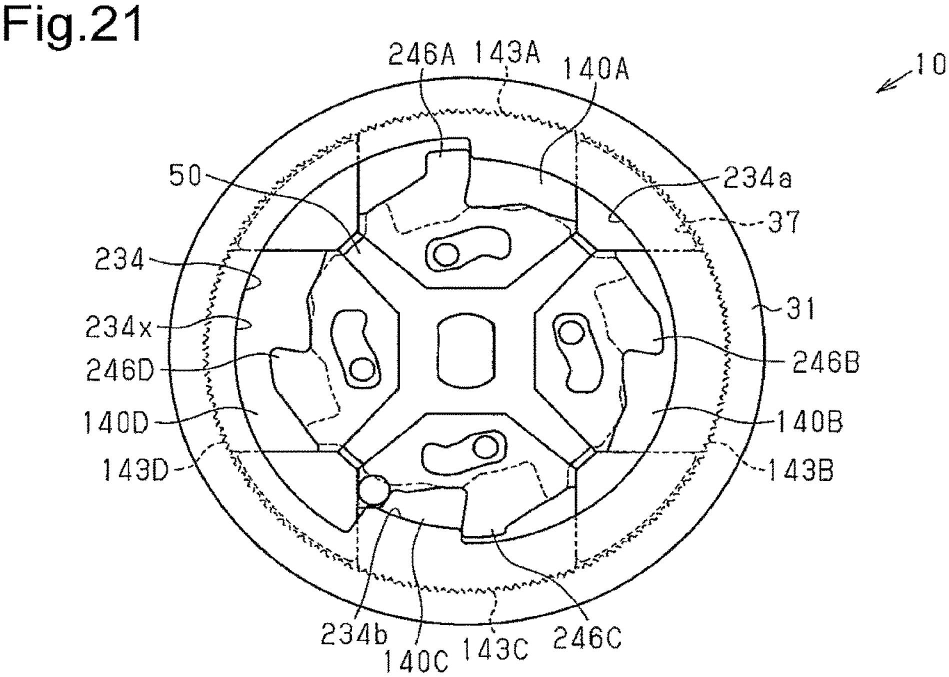
FIG. 21 is a cross-sectional view showing a locked state of a third embodiment of a vehicle seat reclining device.

FIG. 21 shows a locked state in which the outer teeth 143A to 143D of the first to fourth pawls 140A to 140D mesh with the inner teeth 37 of the second bracket 31.

Figure 22:
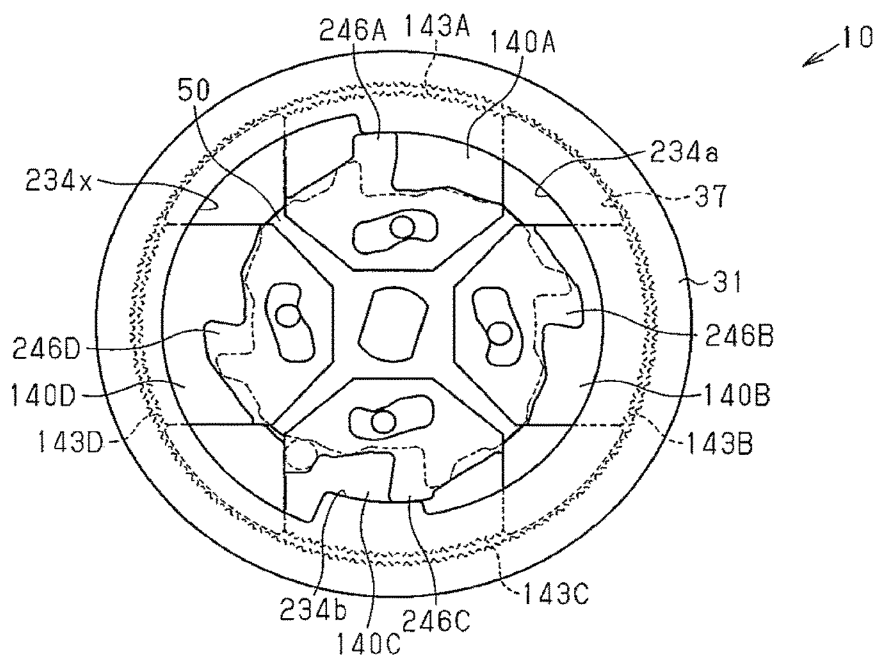
FIG. 22 is a cross-sectional view showing a lock restriction state of the vehicle seat reclining device.

FIG. 22 shows a lock restriction state in which when movement of the first to fourth pawls 140A to 140D toward the radially outer side is limited, the outer teeth 143A to 143D of the first to fourth pawls 140A to 140D do not mesh with the inner teeth 37 of the second bracket 31.

The changes in the positional relationship of the first to fourth pawls 140A to 140D and the first and second pawl restriction portions 234*a* and 234*b* relative to rotation of the second bracket 31 will now be described with reference to FIGS. 23A and 23B.

FIG. 23A shows the positional relationship of the first to fourth limitation portions 246A to 246D of the first to fourth pawls 140A to 140D when the second bracket 31 slightly rotates from the specified angle relative to the first bracket 21 in the positive direction F.

The first limitation portion 246A of the first pawl 140A is located at the first pawl allowance portion 234*x*. The third limitation portion 246C of the third pawl 140C is located at the first pawl restriction portion 234*a*. The first pawl allowance portion 234*x* allows movement of the first pawl 140A toward the radially outer side, the first pawl restriction portion 234*a* allows movement of the third pawl 140C toward the radially outer side. Thus, the vehicle seat reclining device 10 may shift to the locked state.

Figure 23B:
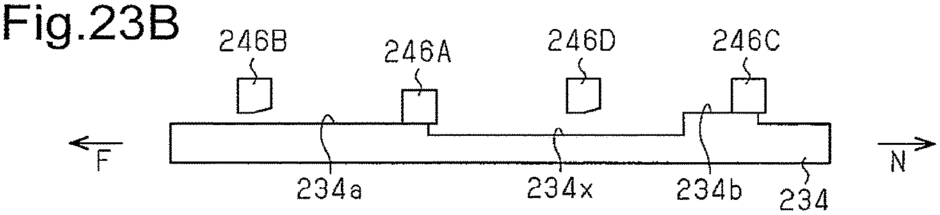

FIG. 23B shows the positional relationship of the first to fourth limitation portions 246A to 246D of the first to fourth pawls 140A to 140D when the second bracket 31 slightly rotates from the specified angle relative to the first bracket 21 in the negative direction N.

The first limitation portion 246A of the first pawl 140A is arranged at the first pawl restriction portion 234*a* and is in contact with the first pawl restriction portion 234*a*. Thus, the vehicle seat reclining device 10 may shift to the lock restriction state.

The third limitation portion 246C of the third pawl 140C is arranged at the second pawl restriction portion 234*b*. The third limitation portion 246C of the third pawl 140C is not in contact with the second pawl restriction portion 234*b*. However, when the above force (pushing force caused by external factors) is applied, the third limitation portion 246C is in contact with the second pawl restriction portion 234*b*.

In the same manner as the first embodiment, the vehicle seat reclining device 10 of the third embodiment has the "circumferential structure of pawl movement limitation," the "radial structure of pawl movement limitation," and the "overlapping structure of control range." Thus, the vehicle seat reclining device 10 of the third embodiment has the same advantage as the advantages of the first and second embodiments.

Other Examples

In the first embodiment, the structure in which the first pawl restriction portion 34*a* extends as compared with the conventional structure shown in FIG. 14 is described. However, in the present technique, the first pawl allowance portion 34*x* may also be extended as compared with the conventional structure shown in FIG. 14. That is, in the present technique, at least one of the pawl movement allowance range AQ and the pawl movement restriction range AP is extended.

In the present technique, the first to third pawls 40A to 40C move in cooperation in the radial direction. Thus, when movement of any one of the pawls is limited, movement of the pawls 40A to 40C toward the radially outer side stops. Accordingly, when a circumferential length is specified for one of the first to third pawl restriction portions 34*a* to 34*c* in correspondence with the angle range of the lock restriction state in the second bracket, the other pawl restriction portions can be shorter than the pawl restriction portion for which the circumferential length is specified. The outer pawl restriction portions are configured to contact the corresponding limitation portions when the second bracket 31 rotates in the positive direction F and has the specified angle. This can shorten the lengths of the other pawl restriction portions. Thus, the first pawl allowance portion 34*x* can be prolonged in the circumferential direction as compared with the conventional structure shown in FIG. 14. This structure expands the control range of the second bracket 31.

In each of the above embodiments, the direction in which the second bracket 31 rotates as the seat back 4 is reclined to the rear is referred to as the rear rotation direction RX, and the rear rotation direction RX is referred to as rotation in the positive direction F. However, the technique of each embodiment is not limited to the rotation direction of the second bracket 31. For example, the direction in which the second bracket 31 rotates as the seat back 4 is reclined to the front may be referred to as the positive direction F.

In the first to third embodiments and the modified examples, the first bracket 21 is fixed to the seat cushion 3, and the second bracket 31 is fixed to the seat back 4. However, the present technique is not limited to this example. For example, the present technique may be applied to a vehicle seat reclining device 10 in which the second bracket 31 is fixed to the seat cushion 3 and the first bracket 21 is fixed to the seat back 4.

The vehicle seat reclining device 10 of the first to second embodiments and the modified examples includes the three pawls 40A to 40C. The vehicle seat reclining device 10 of the third embodiment includes the four pawls. However, the number of pawls is not limited.

In the vehicle seat reclining device 10 of the first to third embodiments and the modified examples, the pawls 40A to 40C are configured to be moved in the radial direction by rotation of the cam 50. However, the means for moving the pawls 40A to 40C in the radial direction is not limited to rotation of the cam 50. For example, the cam 50 may be configured to move in the diametrical direction of the first bracket 21. In this case, the cam 50 is applied to a vehicle seat reclining device 10 including two pawls, and the cam is configured to move in the direction perpendicular to the movement direction (radial direction) of the two pawls.

The invention claimed is:

1. A vehicle seat reclining device comprising:

a first bracket;

a second bracket that rotates relative to the first bracket in positive and negative directions;

a cam that rotates or moves relative to the first bracket; and a plurality of pawls moved in a radial direction of the first bracket and engaged with the second bracket by rotation or movement of the cam, wherein each of the pawls is biased toward a radially outer side and moved in the radial direction in cooperation with the rotation or the movement of the cam, a first pawl and a second pawl of the plurality of pawls each include a limitation portion that limits movement in the radial direction, the second bracket includes an outer circumferential wall including inner teeth that mesh with outer teeth of the pawls, and a first pawl restriction portion and a second pawl restriction portion arranged respectively in correspondence with the first pawl and the second pawl to engage the corresponding limitation portions and restrict movement of the first pawl and the second pawl in the radial direction, the second pawl restriction portion is located toward the positive direction and a radially inner side from the first pawl restriction portion, negative direction ends of the first pawl restriction portion and the second pawl restriction portion are arranged to contact positive direction corners of the limitation portions of the first pawl and the second pawl when a rotation angle of the second bracket relative to the first bracket is a specified angle, the first pawl restriction portion allows movement of the second pawl toward the radially outer side, the first pawl restriction portion extends in the positive direction to the negative direction end of the second pawl restriction portion, and the first pawl restriction portion restricts movement of the first pawl toward the radially outer side when the second bracket is located toward the negative direction from the specified angle and allows movement of the second pawl toward the radially outer side when the second bracket is located toward the positive direction from the specified angle.

2. The vehicle seat reclining device according to claim 1, wherein a third pawl of the pawls includes a limitation portion, the second bracket further includes a third pawl restriction portion arranged in correspondence with the third pawl, wherein the third pawl restriction portion engages the limitation portion of the third pawl to restrict movement of the third pawl in the radial direction, the third pawl restriction portion is located toward the positive direction and the radially inner side, at the same position in the radial direction, or at the radially outer side of the second pawl restriction portion, and a negative direction end of the third pawl restriction portion is arranged to contact a positive direction corner of the limitation portion of the third pawl when the rotation angle of the second bracket relative to the first bracket is the specified angle.

3. A vehicle seat reclining device comprising:

a first bracket;

a second bracket that rotates relative to the first bracket in positive and negative directions;

a cam that rotates or moves relative to the first bracket; and a plurality of pawls moved in a radial direction of the first bracket and engaged with the second bracket by rotation or movement of the cam, wherein each of the pawls is biased toward a radially outer side and moved in the radial direction in cooperation with the rotation or the movement of the cam, a first pawl and a second pawl of the plurality of pawls each include a limitation portion that limits movement in the radial direction, the second bracket includes an outer circumferential wall including inner teeth that mesh with outer teeth of the pawls, and a first pawl restriction portion and a second pawl restriction portion arranged respectively in correspondence with the first pawl and the second pawl to engage the corresponding limitation portions and restrict movement of the first pawl and the second pawl in the radial direction, the second pawl restriction portion is located toward the positive direction and a radially inner side from the first pawl restriction portion, negative direction ends of the first pawl restriction portion and the second pawl restriction portion are arranged to contact positive direction corners of the limitation portions of the first pawl and the second pawl when a rotation angle of the second bracket relative to the first bracket is a specified angle, the first pawl restriction portion allows movement of the second pawl toward the radially outer side, a third pawl of the pawls includes a limitation portion, the second pawl restriction portion extends in the positive direction, and the second pawl restriction portion restricts movement of the second pawl toward the radially outer side when the second bracket is located toward the negative direction from the specified angle and allows movement of the third pawl toward the radially outer side when the second bracket is located toward the positive direction from the specified angle.

4. The vehicle seat reclining device according to claim 3, wherein the second bracket further includes a third pawl restriction portion arranged in correspondence with the third pawl, wherein the third pawl restriction portion engages the limitation portion of the third pawl to restrict movement of the third pawl in the radial direction, the third pawl restriction portion is located toward the positive direction and the radially inner side of the second pawl restriction portion, and a negative direction end of the third pawl restriction portion is arranged to contact a positive direction corner of the limitation portion of the third pawl when the rotation angle of the second bracket relative to the first bracket is the specified angle.

5. A vehicle seat reclining device comprising:

a first bracket;

a second bracket that rotates in positive and negative directions relative to the first bracket;

a cam that rotates or moves relative to the first bracket; and a plurality of pawls that move in a radial direction of the first bracket in cooperation with rotation or movement of the cam to engage the second bracket, wherein each of the pawls is biased toward a radially outer side and moved in the radial direction in cooperation with the rotation or the movement of the cam, a first pawl and a second pawl of the plurality of pawls each include a limitation portion that limits movement in the radial direction, the second bracket includes an outer circumferential wall including inner teeth that mesh with outer teeth of the pawls, and a first pawl restriction portion and a second pawl restriction portion respectively arranged in correspondence with the first pawl and the second pawl to engage the corresponding limitation portions and restrict movement of the first pawl and the second pawl in the radial direction, the second pawl restriction portion is located toward the negative direction from the first pawl restriction portion, negative direction ends of the first pawl restriction portion and the second pawl restriction portion are arranged to contact positive direction corners of the limitation portions of the first pawl and the second pawl when a rotation angle of the second bracket relative to the first bracket is a specified angle, the first pawl restriction portion extends in the positive direction to the negative direction end of the second pawl restriction portion and is longer than the second pawl restriction portion, and the first pawl restriction portion restricts movement of the first pawl toward the radially outer side when the second bracket is located toward the negative direction from the specified angle and allows movement of the second pawl toward the radially outer side when the second bracket is located toward the positive direction from the specified angle.

* * * * *